(12) United States Patent
Hostetter et al.

(10) Patent No.: US 7,877,401 B1
(45) Date of Patent: Jan. 25, 2011

(54) PATTERN MATCHING

(75) Inventors: Mathew Hostetter, Jamaica Plan, MA (US); Kenneth M. Steele, Waltham, MA (US); Vijay Aggarwal, Marlborough, MA (US)

(73) Assignee: Tilera Corporation, Westborough, MA (US)

( * ) Notice: Subject to any disclaimer, the term of this patent is extended or adjusted under 35 U.S.C. 154(b) by 463 days.

(21) Appl. No.: 11/753,315

(22) Filed: May 24, 2007

Related U.S. Application Data

(60) Provisional application No. 60/808,026, filed on May 24, 2006.

(51) Int. Cl.
G06F 7/00 (2006.01)
G06F 17/30 (2006.01)

(52) U.S. Cl. .................................. 707/758; 712/17

(58) Field of Classification Search ............. 707/6, 707/2, 101, 758; 341/51; 713/2; 717/143; 365/49; 704/225; 326/46
See application file for complete search history.

(56) References Cited

U.S. PATENT DOCUMENTS

| | | | | |
|---|---|---|---|---|
| 5,329,405 A * | 7/1994 | Hou et al. | | 707/6 |
| 5,815,096 A * | 9/1998 | Smith | | 341/51 |
| 5,831,883 A * | 11/1998 | Suter et al. | | 708/404 |
| 5,956,724 A * | 9/1999 | Griffiths | | 707/101 |
| 5,990,899 A * | 11/1999 | Whitten | | 345/427 |
| 6,012,057 A * | 1/2000 | Mayer et al. | | 707/6 |
| 7,394,288 B1 | 7/2008 | Agarwal | | |
| 7,411,418 B2 | 8/2008 | Gould et al. | | |
| 7,461,236 B1 * | 12/2008 | Wentzlaff | | 712/10 |
| 2003/0051043 A1 * | 3/2003 | Wyschogrod et al. | | 709/230 |
| 2003/0110154 A1 | 6/2003 | Ishihara et al. | | |
| 2004/0162826 A1 | 8/2004 | Wyschogrod et al. | | |
| 2005/0125650 A1 * | 6/2005 | Chen et al. | | 713/2 |
| 2005/0132342 A1 * | 6/2005 | Van Lunteren | | 717/143 |
| 2005/0286742 A1 * | 12/2005 | Rasmussen et al. | | 382/112 |
| 2006/0020595 A1 | 1/2006 | Norton et al. | | |
| 2006/0085389 A1 * | 4/2006 | Flanagan et al. | | 707/2 |
| 2006/0193159 A1 * | 8/2006 | Tan et al. | | 365/49 |
| 2007/0005596 A1 * | 1/2007 | Brown et al. | | 707/6 |
| 2007/0124146 A1 * | 5/2007 | Van Lunteren | | 704/255 |

FOREIGN PATENT DOCUMENTS

WO   WO 2004/072796 A2   8/2004

OTHER PUBLICATIONS

Wiklund et al, .SoCBUS: Switched network on chip for hard real time Systems, Apr. 22-26, 2003, Proceeds of the Int'l Parallel and Distributed Processing Symposium (IPDPS), pp. 78-85.*

(Continued)

*Primary Examiner*—Yicun Wu
*Assistant Examiner*—Pavan Mamillapalli
(74) *Attorney, Agent, or Firm*—Fish & Richardson P.C.

(57) ABSTRACT

A method for processing data for pattern matching includes: receiving a first sequence of data values; and generating a second sequence of data values based on the first sequence and one or more patterns and history of data values in the first sequence, wherein the second sequence has fewer data values than the first sequence and all subsequences in the first sequence that match at least one of the one or more patterns are represented in the second sequence.

27 Claims, 16 Drawing Sheets

OTHER PUBLICATIONS

Norton, Marc, Optimizing Pattern matching for intrusion detection, 2004, Sourcefire Inc, White Paper.*

Takeda et al., Pattern Matching Machine for Text Compressed Using Finite State Model, Oct. 1997, DOI Technical Report, DOI-TR-142.*

Aho et al., Efficient String Matching: An Aid to Bibliographic Search, Jun. 1975, Communications of the ACM, vol. 18 No. 6 pp. 333-340.*

Amir et al., Efficient Pattern Matching with Scaling, Mar. 1992, Journal of Algorithms, Volume, pp. 344-357.*

Kida et al., Multiple Pattern Matching in LZW Compressed Text, Mar. 30-Apr. 1, 1998, Data Compression Conference, 1998, DCC 98 Proceedings, pp. 103-112.*

Agarwal, Anant. "Raw Computation," *Scientific American* vol. 281, No. 2: 44-47, Aug. 1999.

Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35th International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Performance Analysis of PIM, Stream Processing , and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua, Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <flp://ftp.cag.lcs.mit.edu/pub/raw/documents/RawSpec99.pdf>.

Moritz, Csaba Andras et. al., "Hot Pages: Software Caching for Raw Microprocessors," *MIT/LCS Technical Memo LCS-TM-599*, Aug. 1999.

Dharmapurikar, S. & J. Lockwood. "Fast and Scalable Pattern Matching for Content Filtering," *ANCS'05*, Oct. 26-28, 2005, Princeton, New Jersey, USA.

Tan, L. & T. Sherwood., "Architectures for Bit-Split String Scanning in Intrusion Detection," *IEEE Computer Society*, Jan.-Feb. 2006 (pp. 1-9).

Lin Tan; Sherwood, T., "A high throughput string matching architecture for intrusion detection and prevention", International Symposium on Computer Architecture (ISCA'05), 2005.

Benjamin C. Brodie, David E. Taylor, Ron K. Cytron, "A Scalable Architecture for High-Throughput Regular-Expression Pattern Matching," pp. 191-202, International Symposium on Computer Architecture (ISCA'06), 2006.

Fish & Richardson P.C., Unpublished U.S. Appl. No. 11/564,694, filed Nov. 29, 2006, 55 pages.

\* cited by examiner

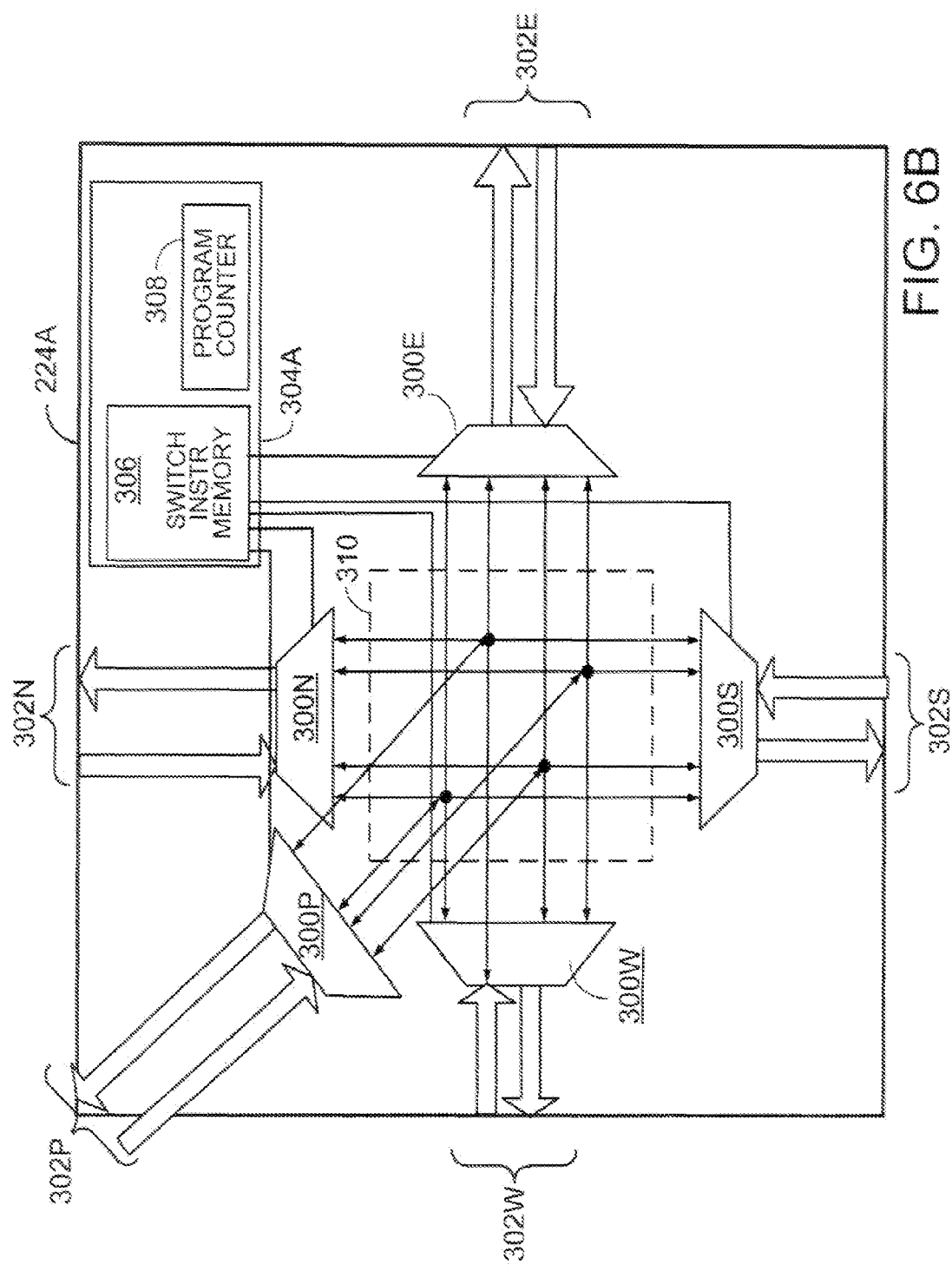

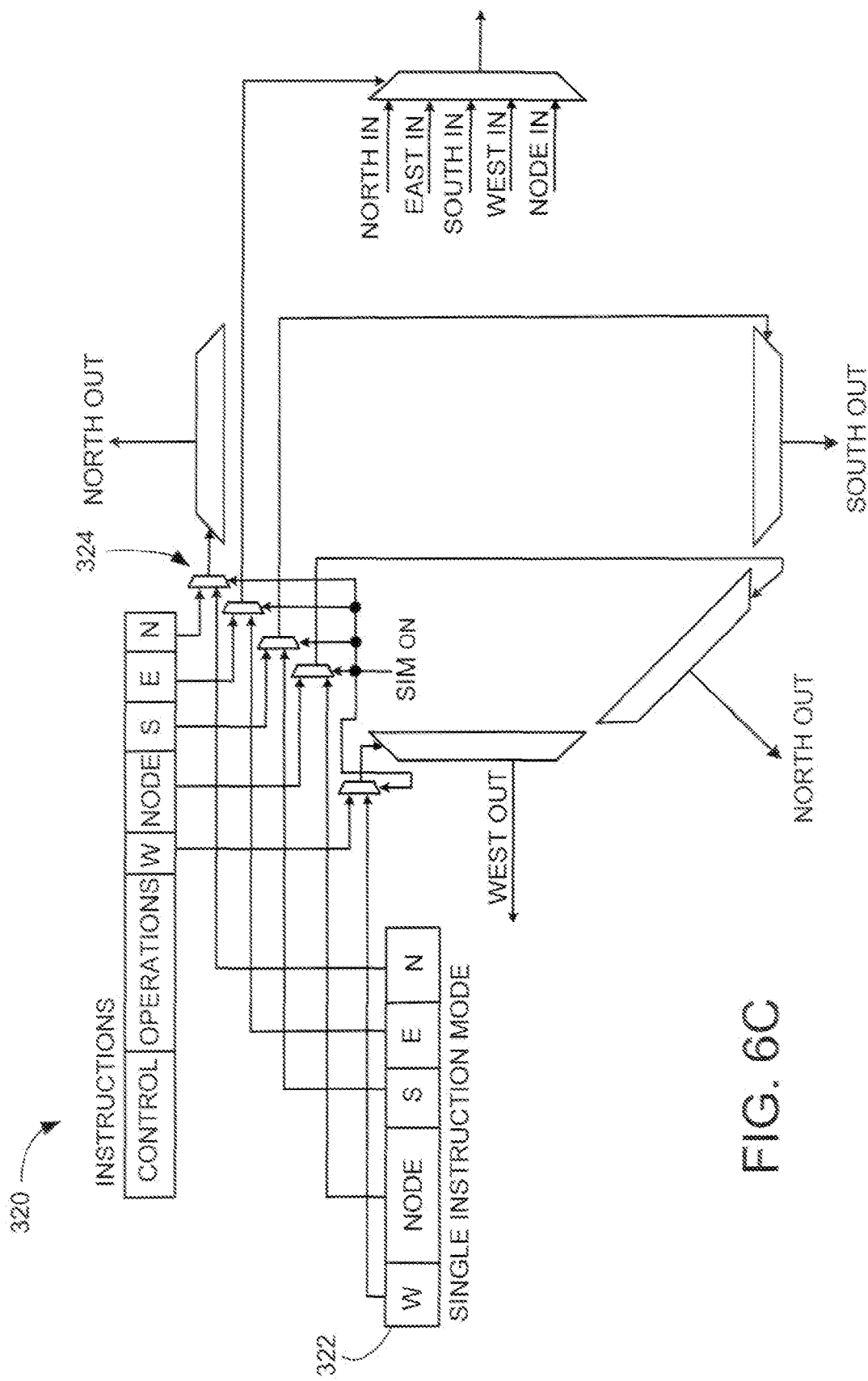

PATTERN MATCHING

CROSS-REFERENCE TO RELATED APPLICATIONS

This application claims priority to U.S. Provisional Application Ser. No. 60/808,026, filed on May 24, 2006, incorporated herein by reference.

BACKGROUND

The invention relates to pattern matching.

One type of pattern matcher checks to see if a sequence of symbols (e.g., represented by data items such as bytes) matches any of a set of predetermined patterns. Pattern matching can be used for virus scanning, network intrusion detection, spam filtering and countless other operations whose computing demands increase with increase in Internet traffic. Matching patterns against a high-bandwidth data stream, such as a 10 gigabit per second Ethernet connection, can be challenging because the high data rate yields relatively few CPU cycles per input byte to examine the data. Complex patterns such as regular expressions can put more demand on the pattern matcher.

Some techniques to match patterns efficiently use pattern-matching finite state machines (PFSMs). A PFSM has associated states, and an input may transition the PFSM from a current state to another state, or an input may cause the PFSM to remain in the current state. Each portion of an input data stream can be considered an input that may potentially cause a transition between PFSM states.

A set of patterns can be compiled offline into one or more PFSMs that are fed portions (e.g., bytes or characters) of a data stream (in some cases, in real time) and report matches as they occur. In principle, any number of patterns can be combined into a single PFSM that uses a given number of cycles of processing time per input byte on average. Unfortunately, the memory size of a representation of this type of PFSM can grow exponentially with the number of patterns it is trying to match. Even though main memory sizes can be large, memory constraints may still be a factor since PFSM performance can be increased dramatically when its representation is able to fit in a processor's memory cache.

SUMMARY

The invention features techniques for transforming an incoming high-bandwidth data stream into a lower bandwidth stream. For example, the incoming data stream is passed through a compressor to generate a transformed data stream. The compression performed by the compressor reduces computational resources, such as memory, used to perform pattern matching. The transformed data stream still matches any of a set of predetermined patterns that the incoming data stream would have matched. The compressor is able to remove data irrelevant to the pattern matching and preserve data that is relevant to the pattern matching. In some cases, a predetermined subsequence is removed. In some cases, a predetermined subsequence is removed based at least in part on a history of data values (e.g., based on position with respect to previous data values). In some cases, a subsequence is replaced with a different (e.g., shorter) subsequence.

In one aspect, in general, the invention features a method for processing data for pattern matching, the method comprising: receiving a first sequence of data values; and generating a second sequence of data values based on the first sequence and one or more patterns and history of data values in the first sequence, wherein the second sequence has fewer data values than the first sequence and all subsequences in the first sequence that match at least one of the one or more patterns are represented in the second sequence.

Aspects of the invention can include one or more of the following features.

Generating the second sequence comprises replacing an original subsequence of data values in the first sequence with a shorter subsequence of data values that corresponds to the same transition vector of a pattern-matching finite state machine associated with the one or more patterns as the original subsequence.

The subsequences in the first sequence that match at least one of the one or more patterns are included in the second sequence.

A given subsequence in the first sequence that matches at least one of the one or more patterns is represented in the second sequence by one or more data values that correspond to the same transition vector of a pattern-matching finite state machine associated with the one or more patterns as the given subsequence.

The given subsequence in the first sequence that matches at least one of the one or more patterns is represented in the second sequence by a single character that correspond to the same transition vector of the pattern-matching finite state machine as the given subsequence.

Generating the second sequence of data values comprises generating data values according to an associated buffer state corresponding to at least some of the first sequence of data values.

The buffer state corresponds to data values stored in a buffer.

The buffer state corresponds to data values associated with a state of a finite-state machine.

Generating the second sequence of data values comprises evaluating data values corresponding to the buffer state for possible reduction.

The buffer state corresponds to fewer than or equal to a maximum number of data values.

Generating the second sequence of data values comprises outputting at least one of the data values corresponding to the buffer state to prevent overflow of the buffer state beyond the maximum number of data values.

Generating the second sequence of data values comprises processing the first sequence according to a finite-state machine.

The number of states in the finite-state machine are determined according to an amount of compression of the second sequence relative to the first sequence.

At least some of the patterns are specified by a regular expression.

In another aspect, in general, the invention features system. The system include a plurality of processor cores interconnected by an interconnection network; and information for configuring the system to execute instructions to receive a first sequence of data values, generate a second sequence of data values based on the first sequence and one or more patterns, wherein the second sequence has fewer data values than the first sequence and all subsequences in the first sequence that match at least one of the patterns are represented in the second sequence, and match the second sequence of data values to the one or more patterns in a plurality of processor cores.

Aspects of the invention can include one or more of the following features.

The system further comprises a memory for storing the information for configuring the system.

The interconnection network comprises a two-dimensional network.

The interconnection network comprises a bus network, a ring network, a mesh network, or a crossbar switch network.

Each of the plurality of processor cores corresponds to a tile on an integrated circuit, each tile comprising: a computation unit; and a switch including switching circuitry to forward data received over data paths of the interconnection network from other tiles to the computation unit and to switches of other tiles, and to forward data received from the computation unit to switches of other tiles.

The computation unit comprises a pipelined processor and the switch is coupled to a plurality of pipeline stages of the pipelined processor.

At least one port of the switch is mapped to a register name space of the pipelined processor.

Aspects of the invention can have one or more of the following advantages.

A compressor can replace a sequence of input characters with a shorter sequence of input characters that has the same transition vector found in a pattern-matching finite state machine, reducing the number of characters to be processed in the PFSM.

A compressor can be implemented as a finite-state machine (FSM).

The number of states in the FSM can be reduced because some states will not be needed due to initial compression that takes place.

A compressor can be implemented as a FSM that contains a buffer (or is associated with a virtual buffer) that is not of fixed length. This allows states to be added that can act on a few likely character sequences, each just long enough to prove they were not the sequence it needed to find a match.

A priority queue in the compressor can be used to expand out the states most likely to be seen, or the states most likely to reduce the expected number of characters outputted.

A compressor can be chained together with itself or with other compressors to enhance its compression ability. By feeding the results of an initial compressor into a subsequent compressor, the resultant character stream can be greatly reduced again with spending a fraction of the effort the original compressor used. This is because the second compressor is working on a much smaller character stream.

A compressor can replace any chosen sequence of characters with a single new alphabet character. This reduces the complexity of the pattern-matching FSM because it no longer needs to match the entire sequence but instead can take action based on finding a single character.

A PFSM or compressor can be optimized for the restricted set of character sequences it might receive. If the PFSM or compressor knows it will be receiving character sequences from another compressor, it can be optimized because certain sequences of characters will always be reduced.

A compressor can have "Anchored states" that know the precise state of the PFSM so it can act efficiently on short character sequences.

Reducing the amount of data the pattern-matching FSM needs to operate on enables it to act on data coming in at higher rates, frees up cycles to perform other processing, or requires cheaper or lower-power hardware.

Compression can reduce complexity of a down stream PFSM. Reducing the complexity of the PFSM reduces the hardware requirements (cost, performance, area, and power) to perform the pattern matching.

By reducing both the amount of data and the complexity of the PFSMs, applications such as regular expression matching can be mapped onto a single multicore integrated circuit, for example. In some implementations, other types of circuits can be used such as FPGAs and ASICs. In some implementations, multicore processors provide advantages for providing both a flexible and powerful architecture.

Other features and advantages of the invention will become apparent from the following description, and from the claims.

DESCRIPTION OF DRAWINGS

FIGS. 6A-6C are block diagrams of switching circuitry.

DESCRIPTION

1 Pattern Matching

One approach to reduce memory used for matching patterns (e.g., memory for storing a representation of a PFSM) is to group the patterns into multiple PFSMs and match an input sequence of symbols against each PFSM separately. With N PFSMs, matching takes N times as many operations to perform as any one of the PFSMs. On a single core processor, this slows down matching by a factor of N, which may no longer be able to keep up with a high bandwidth data stream.

In another approach that uses multiple PFSMs, a process performs some preprocessing that determines which PFSMs might have a chance of matching the input sequence and only runs those PFSMs. This approach can still call for substantial processing overhead to determine which PFSMs might match, and the process may still need to run too many PFSMs to keep up with the rate at which the input sequence is received.

Multicore architectures such as the tiled circuit architecture described herein partially address the CPU load problem by allowing many PFSMs to match in parallel. A chip containing 64 cores, for example, can execute 64 PFSMs simultaneously, thereby increasing the maximum data rate that can be handled for a given set of patterns.

Other techniques that can be used in the context of a single core processor, or a multicore processor environment include techniques for compressing an incoming data stream to increase the efficiency of a pattern-matching system.

1.1 Transition Vectors

The effect of each possible input data value on a PFSM can be described by a "transition vector." For example, each possible input data value can be a character in a character set, each of which is represented by a number (e.g., according to the ASCII character code). When a PFSM receives an input character, it transitions to a next state (which can be the same as the current state). The next state depends on which state the PFSM was in previously and which character it received. The effect of a given input character on a PFSM with N states can therefore be described by a vector of length N indicating to which next state each current state will transition if the PFSM receives that input character.

Figure 1:
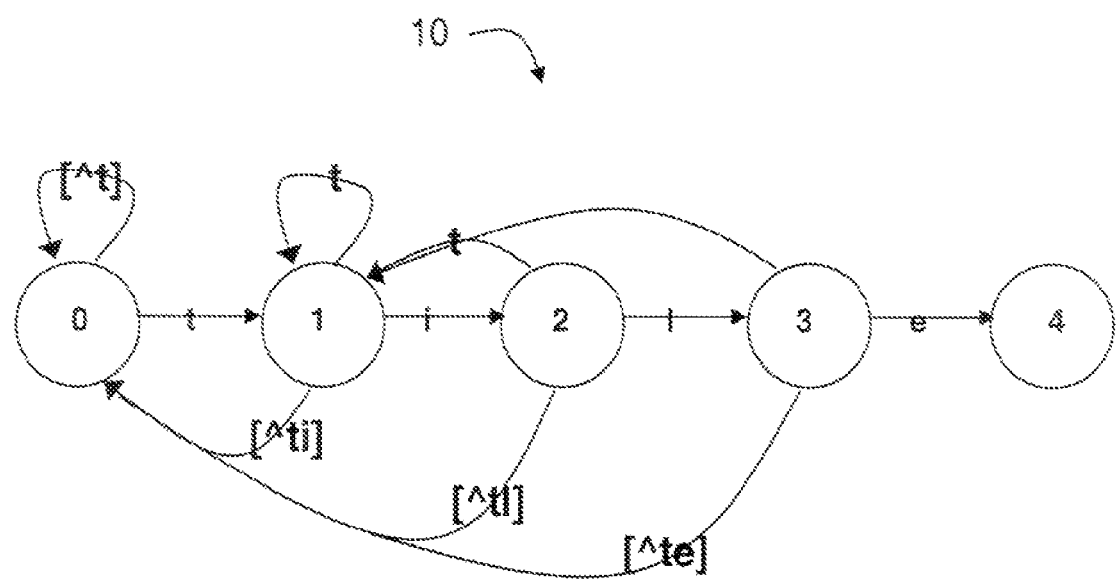
FIG. 1 is a state transition diagram of an exemplary PFSM.

FIG. 1 shows the states (labeled 0, 1, 2, 3, 4) of a state transition diagram 10 for an exemplary PFSM and transitions corresponding to potential inputs (as denoted by an associated regular expression) for the PFSM corresponding to the pattern denoted by the regular expression: .*TILE. Table 1 shows the transition table that includes transition vectors as rows for the input characters T, I, L, E, and "X" representing any other character. A given element of a transition vector gives the next state for the associated input character and the current state that corresponds to the position of the given element. Including in the transition table the transition vectors for all input characters either explicitly, or implicitly using the "default transition" represented by character x in this case, completely describes the PFSM in that it represents every state and every transition.

TABLE 1

| Input Character | Current State | | | |
|---|---|---|---|---|
| | 0 | 1 | 2 | 3 |
| T | 1 | 1 | 1 | 1 |
| I | 0 | 2 | 0 | 0 |
| L | 0 | 0 | 3 | 0 |
| E | 0 | 0 | 0 | 4 |
| X | 0 | 0 | 0 | 0 |

1.2 Character Sequences

The net effect of a given sequence of input characters on a PFSM can also be described by a transition vector. Similar to processing a single input character, processing a sequence of characters moves each state to another state in a predictable way. The net transition corresponds to multiple "hops," but nevertheless the net effect of a character sequence is a single transition vector just like that of a character. The transition vector for a given character sequence can be constructed by starting from each potential initial state and walking character by character through the input string until finding the final state for that initial state. In the example above, the transition vector for the sequence "TI" is (2, 0, 0, 0) (assuming a case insensitive PFSM). In other words, the PFSM transitions to state 0 unless it started there, in which case it transitions to state 2.

If any two character sequences correspond to the same transition vector, sending either sequence to the PFSM has the same effect. A transition vector for a character or sequence of characters specifies how a PFSM will move to a new state from any state. If the PFSM is in a current state 0 it will go to a state determined by transition vector[0], and if it is in a current state 1 it will go to a state determined by transition vector[1], and so on. Sending a character sequence as input to a PFSM and applying transition vectors for the individual characters has the same effect on the final PFSM state as applying that sequence's transition vector to the PFSM. Consequently, sending either of two sequences with the same transition vector will place the PFSM in the same final state.

For example, the transition vector for "TL" and the vector for "EI" are both (0, 0, 0, 0). For each potential initial state of the PFSM, the PFSM will end up at the same state with either sequence. In this example, sending "X" would also end in the same state because it has the same transition vector.

1.3 Compressor

A compressor can replace a sequence of input characters with a shorter sequence of input characters that has the same transition vector for a given PFSM. The compressor sends the compressed input sequence to the PFSM. For many applications, it doesn't matter which sequence of characters the PFSM actually receives as input, as long as they have the same net effect. So replacing an input character sequence with a shorter sequence that has the same transition vector can be advantageous for those applications because it puts less load on the PFSM. The compressor and PFSM can be implemented in separate processor cores, or can be implemented in the same processor core.

In the example above, the sequence "LT" has the transition vector (1, 1, 1, 1). This is the same transition vector as for the sequence "T". So the compressor can be configured to send a single "T" in place of the sequence "LT" within a character stream, and the PFSM ends up in the same final state. Similarly, the sequence "TLTILLTEETTETET" has the same transition vector as "T" and can be replaced with a single "T".

A compressor need not send characters to the PFSM every time it makes a reduction. Considering again the example of "LT" being replaced with "T", upon receiving "LT" the compressor can immediately send a "T" to the PFSM. But it may be more efficient to send fewer characters to the PFSM by temporarily storing a limited number of characters in a buffer. For example, in one implementation the compressor can store characters in a buffer and reduce the buffer's contents to a shorter but equivalent sequence whenever possible and send characters to the PFSM when the buffer would otherwise overflow.

In one example, the compressor has a buffer that stores two characters that have been received but not yet sent to the PFSM. If the compressor has an "L" in its buffer and then receives a "T", it can replace its buffer contents with a single "T" since that character has the same transition vector as "LT". During this buffer replacement, no characters are sent to the PFSM. Replacing "LT" with "T" frees up a character in the buffer. If the next character is a "T", the compressor can safely replace the "TT" in the buffer with a single "T", again freeing up space in the buffer. In this example, the compressor has still not sent anything to the PFSM. Indeed, any number of contiguous "T" characters will get collapsed to a single "T" by the compressor without sending characters to the PFSM.

Now suppose the buffer holds "TI", and the compressor receives an "L". The sequence "TIL" does not have the same transition vector as any shorter character sequence, so a reduction to free up some buffer space is not performed. In this case, since the buffer is out of space, the compressor sends "T", the first character in the buffer, to the PFSM (causing a transition from state 0 to state 1) and "shifts over" the pending characters so the buffer now holds "IL". If the next character were an "I", the compressor could replace "ILI" to store in the buffer a shorter sequence with an equivalent transition vector such as "X" and not send any characters to the PFSM.

The compressor can be implemented as a finite-state machine. As an alternative to a physical buffer, the "buffer" described above can be represented in states of a finite state machine for the compressor by having a different state for each possible set of buffer contents that might appear. With this buffer representation, a compressor finite state machine receives a character at an input, optionally outputs one or more characters, and then transitions to a new state corresponding to the new (and possibly reduced) buffer contents. There is not necessarily a physical buffer or memory location that stores a given character sequence (e.g., "TI"), but a given state would represent a virtual buffer containing "TI", for example.

There need not be states corresponding to buffer contents that could never arise. For example, if "TT" is reduced to "T", there does not need to be a state corresponding to storing "TT" in the buffer. So the number of states needed for a given buffer length depends on how many character sequences have distinct effects on the PFSM, which is a property of which patterns it is matching against. Generally, the more patterns there are, the more distinguishable character sequences there tend to be, and the less effective compression becomes.

Additionally, the buffer does not need to have a fixed length. Some character sequences in the input data may be much more likely than others. Having a fixed-length buffer may cause the compressor to overflow the buffer and emit characters for common input sequences that turn out not to be interesting after a few characters later. This can increase bandwidth to the PFSM unnecessarily.

Because the buffer contents can correspond to a virtual construct in the compressor state machine, there is no reason that there cannot be states corresponding to longer buffer sequences than would otherwise fit into a physical buffer of a given length. For example, it might be worth augmenting the two-character buffer compressor described above with another state indicating the buffer was holding "TIL". This would prevent characters from needing to be emitted to the PFSM if the character sequence "TILT" were observed. But without this additional state, "TIL" would cause the compressor to emit a single "T" to the PFSM and shift to storing "IL" (or being in a state that represents a virtual buffer storing "IL"). Then, as "IL"+"T" gets collapsed to "T", it becomes evident (too late) that the "T" already emitted did not need to be sent to the PFSM. For example, in one approach the compressor has fairly long chains of states for a few likely character sequences, each just long enough to prove they were not the sequence it needed to find a match. Additionally, shifting more than one character out of the buffer at a time can reduce the number of states in the compressor.

1.4 Generating Compressors

A compressor can be automatically generated from one or more PFSMs.

Space is a relevant factor in considering how to implement the compressor. With no space limit, one could just build an enormous compressor that would do all the same work that the PFSMs do and either emit nothing or emit the shortest character sequence that causes some PFSM to match. But this does not enable the compressor to provide an overall efficiency increase. In some cases, it is helpful to limit the compressor size (e.g., to whatever fits in a processor's data cache).

The following is one exemplary algorithm to generate a compressor finite state machine to operate with a PFSM or set of PFSMs, given a fixed-size "buffer" (physical or virtual). The algorithm could alternatively be limited by the number of states, rather than the buffer size, which may be more closely correlated to the final memory footprint of the compressor. At a high level, this algorithm expands out all character sequences up to a given length and determines which sequences reduce to shorter sequences. The algorithm is as follows:

1) Create a hash table that maps a transition vector to a state in the compressor finite state machine being generated.

2) Create a breadth-first search double-ended queue (or "BFS deque") to be used for breadth-first search. The BFS deque holds compressor states whose successors are not yet computed.

3) Create the compressor's initial "root" state. During construction, each state keeps track of its "buffer" (the shortest string that corresponds to an associated transition vector). For the initial state the buffer is empty. Add the initial state to the hash table using as a key the transition vector where every state maps to itself. Add the initial state to the BFS deque to seed the recursion.

4) While the BFS deque is not empty:
   a) pop N, the head of the BFS deque (i.e., the oldest entry)
   b) for each possible input character 'c':
      i. compute the transition vector for c starting from N's transition vector. For example, if N's buffer holds "XY" and c is "Z" compute the transition vector for "XYZ".
      ii. look up the transition vector in the hash table.
         a. if that transition vector is already in the hash table, set N's successor for 'c' to the existing state. This is the "reduction" case—some shorter character sequence has the same transition vector.
         b. else if N's buffer size is less than the specified maximum, create a new state for the successor and add it to the hash table and BFS deque. This is the "add one more character to the buffer and keep going without emitting anything" case.
         c. else create a new state that emits the first character listed in N's buffer and then jumps to the state corresponding to the transition vector for the characters in the buffer after the first one. This is the "emit a character and shift the buffer" case. Because longer buffers, this will find a state for the shorter sequence to which it is reducing.

Markov models or other prediction schemes used during compressor generation can improve the compressor's efficiency.

As noted above, using a fixed-size buffer may not be optimal. This exemplary algorithm compresses common character sequences only as much as uncommon ones, which may be overall worse given a fixed limit on the compressor's size. It may be better to have some states "look farther ahead" on common character sequences before giving up and emitting a character to the PFSM, even though that means in unlikely cases the compressor will give up and emit characters sooner than it otherwise would.

Using a training set of input files possibly summarized by a Markov model or other mechanism provides the algorithm creating the compressor information about which states are most profitable to expand given a limited state budget. A priority queue can be used to expand out the states most likely to be visited. Other priority functions are possible, such as the states that seem most likely to reduce the expected number of characters output if they are expanded out because their successors are likely to reduce. Other generic optimization techniques, such as simulated annealing, genetic algorithms, etc. can also be employed to improve a compressor's efficiency.

Alternative algorithms to generate a compressor FSM can include starting with a trivial compressor FSM, attempting to compress a training set, and determining which states are responsible for emitting the most characters. Each of those states can be "expanded" so they "look deeper" in the input to try to avoid emitting anything. This process is repeated until reaching a limit on the number of available states.

For example, another exemplary algorithm for generating a compressor FSM is as follows:

1) Create an initial compressor consisting of a root state and one state for each input alphabet character. Each of those states simply emits its input character and transitions back to the root state. This is a complete compressor state machine, but it performs no compression at all.

2) While the number of states in the compressor is below some fixed limit:
   a) feed all the training set data through the current compressor, and note how often each state emits a character. If desired, these counts can be weighted for the importance of each training set.
   b) sort the states by how many (weighted) characters they emitted
   c) "expand out" each state responsible for a significant fraction of the total characters emitted by the compressor:
     i. give the state a transition edge for each possible character that the compressor might receive. If the resulting character sequence yields a transition vector equivalent to some state already created, the transition points to it. Otherwise, create a new state that emits one or more characters and then transitions to a simpler state (recursively creating simpler states if necessary).
     ii. modify the current node to no longer output anything.

1.5 Composing Compressors

A compressor can be chained together or "composed" with itself or with other compressors to enhance its compression ability. Because the output of a compressor has exactly the same matching properties as its input for a given PFSM, one compressor can legally feed into another. This might achieve a better compression ratio than either compressor alone. One can imagine a small, simple compressor weeding out some obvious garbage and then feeding the results into a more complex compressor that can be optimized to know it will never see the garbage sequences weeded out by the simple compressor.

A compressor can even feed into another instance of itself. It may not be apparent that this helps, but it actually does, up to a point. When a compressor is forced to emit a character and shift its buffer, some imminent character may reduce the rest of its buffer to some much shorter sequence. This can leave "obvious garbage" in the output that the original buffer was not wide enough to spot. The example described above of the .*tile matcher with a two character buffer would emit "TT" in place of "TILT". Feeding the "TT" through the same compressor again would reduce that to "T".

Composing a compressor with itself multiple times has some implementation advantages. The processor executing the compressor has its state machine stored it its cache. Applying the exact same compressor again "in a chain" on that same processor allows the cache memory to be reused. Using a different, perhaps more specialized compressor would use different memory locations and could call for the use of another processor core in a multicore architecture, for example, for the extra cache space.

Composing n compressors in a chain does not run n times slower, because each compressor is emitting fewer characters to the next. For example, an exemplary compressor removes 80% of its input characters (leaving 20%). When composed with itself, the second compressor removes 50% of its input (leaving 10%), for a total end-to-end reduction of 90%. If the first compressor takes one unit of CPU time, the pair takes only 1+0.2 or 1.2 units, because the second compressor is only processing 20% as many characters as the first. Spending 1.2× the processing power to cut the net number of output characters in half (10% vs. 20% of the original stream) is a great tradeoff.

Composing a compressor with itself can be implemented as a nested loop, for example. The inner loop is the first compressor in the chain. It breaks out to the containing loop whenever it wants to emit something. That outer loop then looks at the emitted character and advances its own state, possibly emitting a character to yet another outer loop level or to whatever is consuming the compressor's output (perhaps the matching PFSM (or PFSMs), memory, or to another compressor running on a separate processor core, etc.)

Compressors can also be composed according to a directed acyclic graph (e.g., a tree). A general purpose compressor shared by many PFSMs can "multicast" its output into multiple more specialized compressors customized for smaller sets of PFSMs.

1.6 Replacement

A compressor can replace any chosen sequence of characters with one or more "artificial" (or otherwise unused) characters added to the alphabet. For example, the compressor can collapse a sequence of characters to a single new character (e.g., called "alpha"). Rather than sending, for example, the string "SOMETHING" to the PFSMs, the compressor would send a single alpha. This can be advantageous if some of the characters in "SOMETHING" appear in no other pattern, as they can then be deleted from the PFSM's input alphabet (the alphabet of all characters potentially appearing in an input stream), which may make the memory representation of the PFSM smaller. The states needed to match all the separate characters in "SOMETHING" can also be replaced with a single state looking for alpha. Additionally, sending a single alpha character reduces the bandwidth to the PFSM when "SOMETHING" shows up in the input stream.

To examine why and when this replacement transformation is legal, we note that any character or sequence of characters can be uniquely described by its transition vector. The sequence "SOMETHING" has such a transition vector. Given this transition vector, new transitions (corresponding to the single character alpha) can be added to the PFSM that implement this transition vector. For example, each state gets a new transition that directly points to the same final state in which it would have eventually ended up if multiple transitions for the respective characters of the string "SOMETHING" were followed.

Depending on how the PFSM is represented in memory, if the transition vector for alpha is similar to the transition vector for another character, it may be the case that adding alpha has little harmful effect on the memory size of the PFSM. In some cases, the new transitions for alpha will make the representation smaller if alpha allows other alphabet characters, states and/or transitions to be deleted.

Note that deleting entries or reordering a PFSM or compressor input alphabet corresponds to changing the specific constants output by the compressor feeding a PFSM data. No extra conversion step needs to be introduced at runtime.

1.7 Optimizations

A PFSM or compressor that is receiving its character sequence from a compressor can be optimized for the restricted set of character sequences it might receive.

For example, for the pattern "ab*c" (where '*' indicates a match with zero or more instances of the preceding character), a compressor can transform sequences like "abc", "abbbbc", and "abbbbbbbbc" into "ac" because they are all equivalent with respect to this pattern. Therefore the PFSM or compressor receiving the compressor's output can discount the possibility of receiving a "b" character at all, and optimize its representation accordingly. This optimization can allow any or all of deleting finite states, transitions, and alphabet characters, for example.

One way to perform this optimization is to simultaneously walk through state transitions in the compressor and in the compressor's target and see which transitions and states get visited. When this recursion visits a (compressor, target) pair of states it has seen before, that branch of the recursion can stop. Once the recursion is done, this optimization pass deletes unvisited states, transitions and alphabet characters and applies other PFSM reduction techniques to the result.

1.8 Anchored states

Compressor states called "anchored states" may be advantageous. There may be some advantage to modifying the compressor generation algorithm to include states of a compressor FSM for short character sequences, such as one character, that are implicitly "anchored" to the beginning of all of the patterns. For example, suppose a compressor C sends a character sequence downstream to two different PFSMs P1 and P2. The compressor C can be implemented as a finite-state machine, as described herein. When C processes a sequence of input characters, it can replace any sequence of characters S1 with a shorter one S2 that has the same transition vector for each of the two PFSMs. In that case, no matter what state P1 and P2 are currently in, and no matter whether they process S1 or S2 they will end up in the same state.

The possibility that the two sequences S1 and S2 have the exact same transition vector is not very likely. For the exact equivalence to hold, it would need to be true that for any possible state in either P1 or P2 the sequences S1 and S2 have precisely the same effect. Even one exception, like S1 and S2 have the same effect unless P1 is in state 37, is enough to prevent the exact equivalence of the replacement, because P1 could be in state 37.

But, if C had information about what states P1 and P2 might be in, that information could be used to ensure that the two sequences S1 and S2 have the same effect without necessarily having the exact same transition vectors. For example, if C had information that P1 was definitely in its state 0 and P2 was definitely in its state 0, 51 and S2 only need to cause the same state transition starting from state 0 in P1 and state 0 in P2, rather than in every possible state in both P1 and P2. There might be many shorter sequences S2 that have the same effect as S1 in this very specific case, making compression easier.

At the initialization of the system, before C has ever processed any input characters at all, it may be an assumed initial condition that C, P1 and P2 are all in their initial starting state (e.g., state 0). The compressor C can be implemented so that, starting from this initial state, it keeps track of exactly which states P1 and P2 are in, so it can replace S1 with S2 when they cause P1 and P2 to move to the same successor states starting from some known current states. As indicated above, this is a more likely substitution to make. The more information C has about what states P1 and P2 are in (even without always knowing exactly what states they are in), the more choices may exist for substituting a shorter sequence S2 for S1. The sequences S1 and S2 only have to be equivalent for sets of possible states that P1 and P2 might currently be in, rather than for every possible state.

The amount of information that can be practically maintained about what states P1 and P2 could be in is limited, however. Storage constraints may prevent C from keeping track of every possible combination of states of P1 and P2. In the extreme case, there would be no point in having P1 and P2 since C would be effectively implementing both P1 and P2. In a more practical case C can have a number of states in which it is known exactly what states P1 and P2 are in, but eventually it does not keep track of the detailed state information and stops storing information about which states P1 and P2 are in, falling back to the pessimistic rule that full transition vectors must be equal to perform a replacement.

So when the FSM for C is in an "anchored" state it has information about what state each downstream PFSM is in, so it can predict what effect any input character will have on all of them. Once C "gives up," it's hard to get back to the anchored state. But C might see a sequence of characters that definitely puts each of P1 and P2 into a definitely known state (such as state 0), at which point it could jump back to being in an anchored state like it was at initialization, where it was able to compress better.

The following example uses the ".*TILE" example described above.

Suppose the very first characters C receives after initialization are "LE". In a naïve implementation of C, it is possible that the PFSM might have been in state 2 before it saw the "LE". State 4 is special, since it indicates a successful pattern match (such as spotting a virus in a packet), so C is required to forward the "LE" to the PFSM to possibly trigger the match and alert the user.

However, since the first two characters were LE, the compressor C can use the knowledge that the sequence "TILE" could not have been received yet. In an anchored state implementation, C would compress better when it was certain that the PFSM was in state 0 (or possibly a handful of other states it might somehow know the PFSM would end up in. In this example, C would completely discard the "LE", knowing that the PFSM was still staying in state 0. Whenever it received an "X" it could go back to this anchored state, being certain that PFSM was now in state 0.

These anchored states aren't obviously useful because once the compressor leaves them it can rarely or never go back. But they solve a subtle problem. A buffer that corresponds to the suffix of some pattern typically needs to be emitted in its entirety just in case the PFSM happens to be in the right state to notice the match. It can be inefficient to make this pessimistic assumption for very short patterns, such as a single character, as they will often be the suffix of some pattern. So they may get emitted over and over again. Single character states are needed when the matching process first starts up, since it has not seen any characters yet, but not later if no state ever emits-and-reduces down to one character, which they typically would not. So it's good to partition initial states away from the "could be anywhere" states in some circumstances.

1.9 Performance

Worst-case performance can be detected but not necessarily avoided. For example, an attacker trying to slow down the pattern matcher could send a character sequence that does not compress well or at all. Because of the additional overhead of compression, such a system might perform worse than one with no compression at all (although the compressor's output is generally not bigger than its input). Failure to compress well could be detected by higher-level software that detects such an attack, discards the offending packets and perhaps alerts an administrator. The software could also turn off compression in situations where it is not helping.

1.10 Exemplary Pattern Matcher

Figure 2:
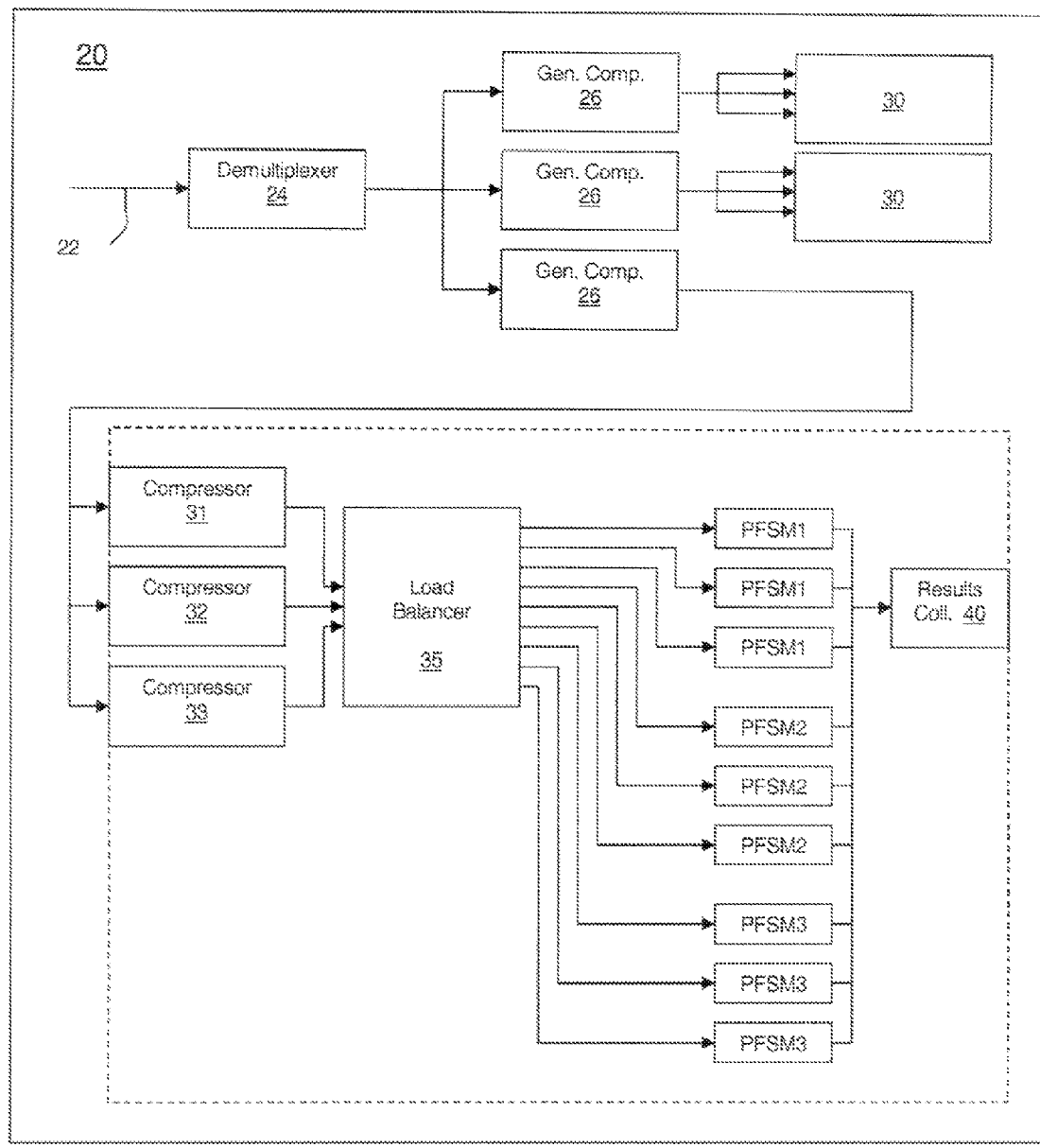
FIG. 2 is a schematic diagram of an exemplary pattern matching system.

Referring to FIG. 2, a pattern matching system 20 includes components to process an input stream 22 at a potentially high data rate (e.g., 10 Gbit/sec) in a multiprocessor environment. The patterns can be defined, for example, according to a "regular expressions" (e.g., as used by the "grep" Unix operating system command line utility). Each component can be implemented on one or more processor cores on a multicore integrated circuit such as the tiled processor 50 shown in FIG. 3.

The system 20 includes a stream demultiplexer 24 that is configured to break down the stream 22 into segments (e.g., packets or portions of packets) and distribute the segments to multiple general compressors 26. The output from each general compressor 26 can then be distributed to more specific processing modules 30 to perform further compression, load balancing, and distribution to one or more PFSM modules for specific sets of patterns to be matched. The general compressor 26 can optionally perform additional processing on the compressed stream, for example, to determine whether the data in a given output should be forwarded to a specific PFSM.

For example, one of the specific processing modules 30 includes a set of specific compressors 31, 32, 33 that are customized for pattern matchers implemented by PFSM1, PFSM2, PFSM3, respectively. A load balancer 35 then distributes the respective compressed streams to sets of one or more (in this example, three) PFSMs for each pattern matcher. The load balancer 35 can also determine the order of execution for each PFSM. If on-chip memory is limited, the output of the specific compressors can also be stored off-chip (e.g., in main memory) temporarily and retrieved later by the load balancer. The outputs of the pattern matcher modules implementing the PFSMs (PFSM1, PFSM2, PFSM3) can then be funneled into a results collector module 40.

Figure 3:
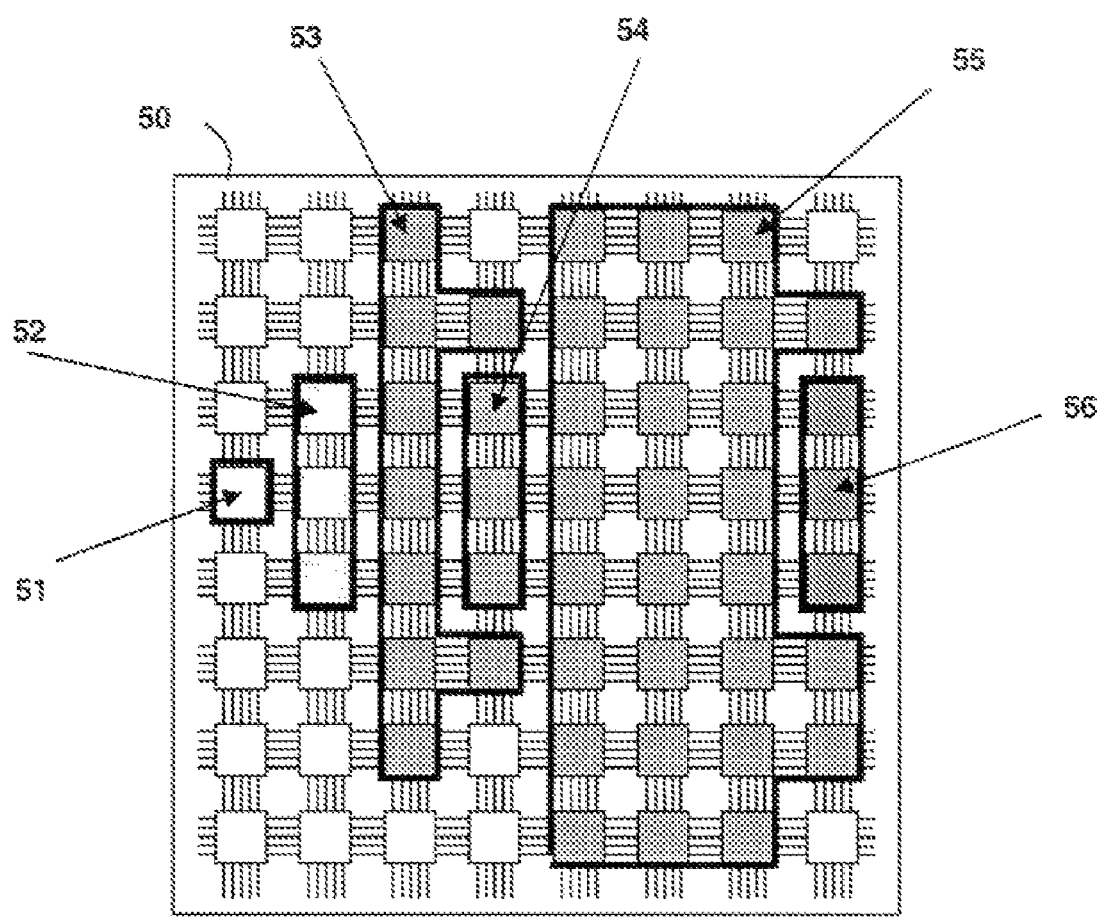
FIG. 3 is a schematic diagram of a tiled processor with components mapped to tiles.

FIG. 3 shows an exemplary mapping of components to tiles on the tiled processor 50. One tile 51 is configured to implement the demultiplexer 24 and is located at the edge of the mesh network of tiles to receive the input stream 22 over an input/output (I/O) interface. Each of a set of three tiles 52 is configured to implement one of the general compressors 26. The specific compressors 31-33 are implemented on a set of nine tiles 53, with each general compressor 26 feeding to three specific compressors 31-33. The load balancer 35 for each of the three main branches is implemented in one of the tiles in a set of three tiles 54. The PFSMs are then implemented in a set of 27 tiles 55, with each main branch feeding to nine PFSMs (three each of PFSM1, PFSM2, PFSM3). A set of three tiles 56 respectively implement the results collector module 40 for each branch. In this example, each module is implemented in a single tile. In other examples, a given module may be implemented in more than one tile, or a single tile can implement more than one module. The communications between modules is implemented over the on-chip network, for example the dynamic network described in more detail below. The spatial distribution of the assigned tiles can be selected, as in this example, to provide short paths from one module to the next; however, in general, a given module can be implemented in any tile and is still able to communicate with any other tile.

2 Tiled Circuit Architecture Overview

The following is example of a tiled circuit architecture that can be used to implement the compression and pattern matching techniques.

Figure 4:
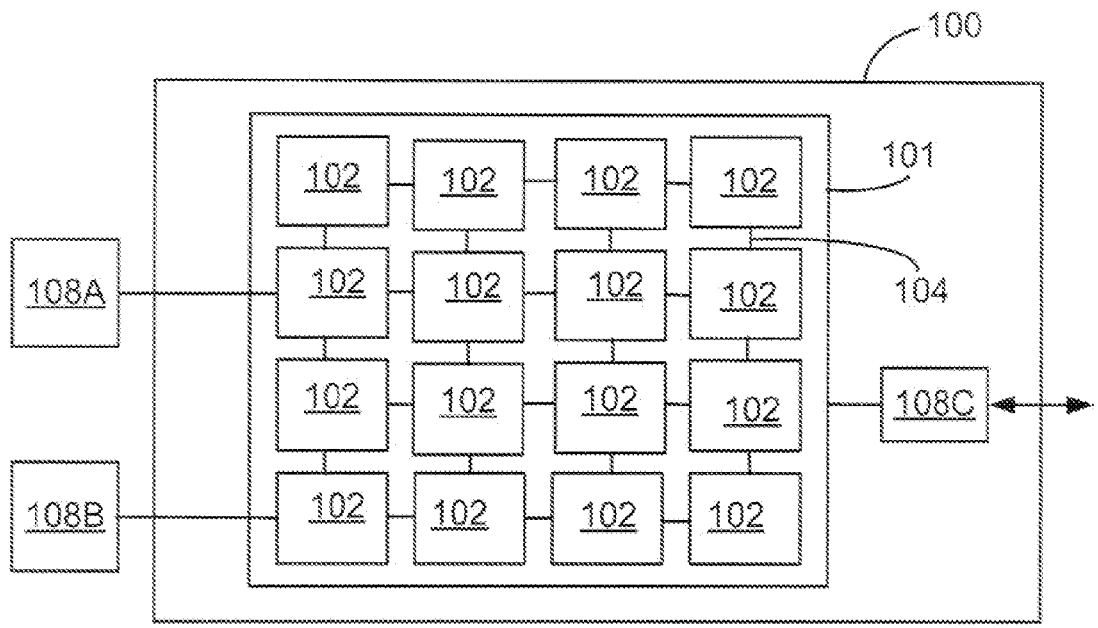
FIG. 4 is a block diagram of a tiled integrated circuit.

Referring to FIG. 4, an integrated circuit 100 (or "chip") includes an array 101 of interconnected tiles 102. Each of the tiles 102 includes a processor (or "processor core") and a switch that forwards data from other tiles to the processor and to switches of other tiles over data paths 104. In each tile, the switch is coupled to the processor so that data can be sent to or received from processors of other tiles over the communication fabric formed by the switches and data paths. The integrated circuit 100 includes other on-chip circuitry such as input/output (I/O) interface circuitry to couple data in and out of the circuit 100, and clock distribution circuitry to provide clock signals to the processors of the tiles.

The example of the integrated circuit 100 shown in FIG. 4 includes a two-dimensional array 101 of rectangular tiles with data paths 104 between neighboring tiles to form a mesh network. The data path 104 between any two tiles can include multiple "wires" (e.g., serial, parallel or fixed serial and parallel signal paths on the IC 100) to support parallel channels in each direction. Optionally, specific subsets of wires between the tiles can be dedicated to different mesh networks that can operate independently.

In some examples, the network include paths that extend to diagonal neighbors or to tiles that are multiple rows or columns away. Other examples include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented, for example, off-chip or in logic blocks within a tile or on the periphery of the integrated circuit 100.

The following exemplary implementations are described in the context of tiles that each have the same structure and functionality. Alternatively there can be multiple "tile types" each having different structure and/or functionality. For example, tiles that couple data off of the integrated circuit 100 can include additional circuitry for I/O functions. Tiles are not necessarily arranged in a regular rectilinear array.

Figure 5A:
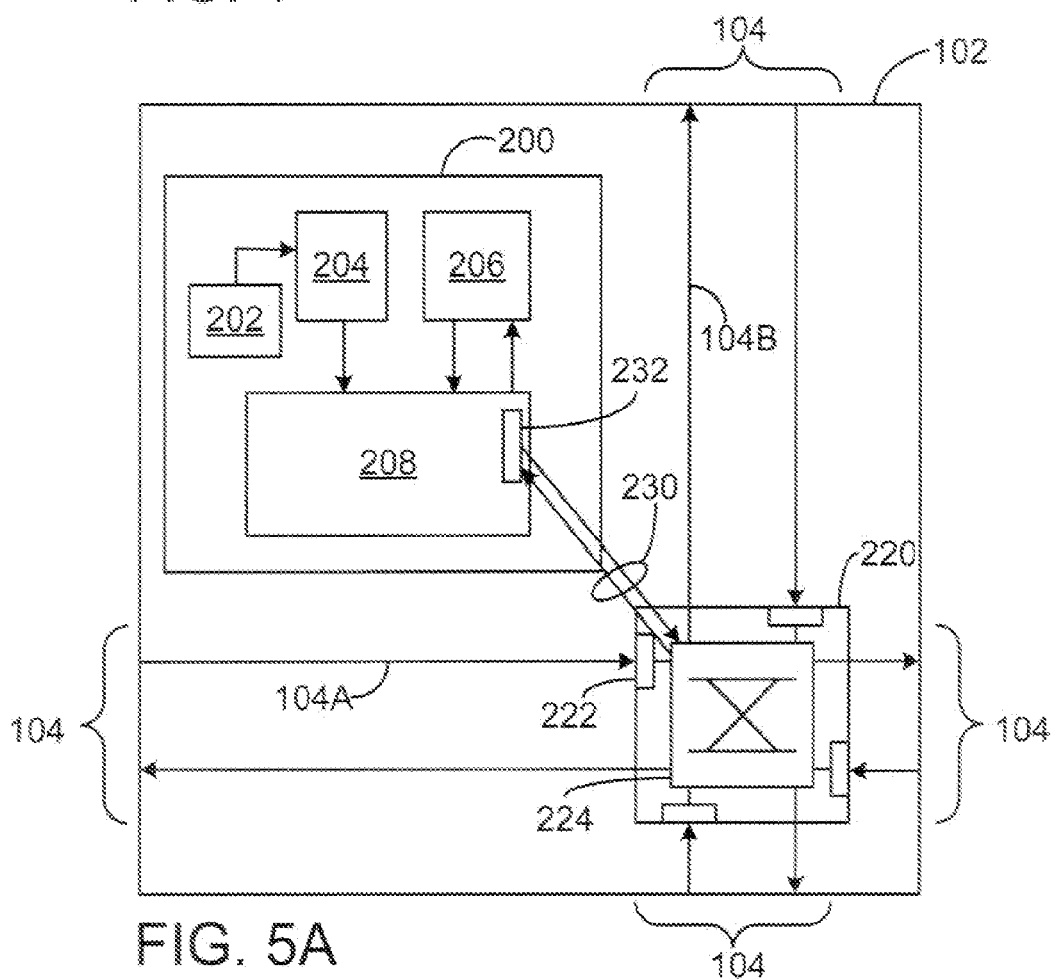
FIG. 5A is a block diagram of a tile.

Referring to FIG. 5A, a tile 102 includes a processor 200, a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit.

The processor 200 can be multithreaded and/or have capabilities of a Very Long Instruction Word (VLIW) processor, a superscalar processor, or a vector processor. A VLIW processor can issue multiple instructions based on a stream of macro instructions including subinstructions designated to be executed concurrently by a compiler. A superscalar processor can issue multiple instructions by partitioning one or more instruction stream at run time to multiple functional units. A vector processor can execute instructions using multiple functional units to operate on respective components of data. A multithreaded processor can execute multiple streams of instructions (or threads) within different respective functional units, and/or within a common time-shared functional unit by switching contexts.

In some examples, the processor 200 is a coarse grain multithreaded (CGMT) processor that switches contexts on long latency events such as cache misses to memory or synchronization faults. A multithreaded processor in a tile may also switch contexts when it has to wait on the a network port. In some examples, the processor 200 is a fine grain multithreaded (FGMT) processor that switches contexts every cycle or every few cycles whether there is a long latency event or not. In some examples, the processor 200 is a simultaneous multithreaded (SMT) processor that includes multiple functional units (e.g., in multiple pipelines) to execute instructions from multiple threads without necessarily needing to switch contexts, such as in a superscalar processor.

In some examples, the networks in the tiled array are configured to enable network ports to be shared among multiple threads running in multithreaded processors in the tiles. For example, the networks allow data for different threads to be interleaved such that, if a processor switches context while a first thread is writing to or reading from a network port, the second thread can also write to or read from the network port.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

2.1 Switch Operation

Continuing to refer to FIG. 5A, a tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In some implementations, the processor 200 receives a stream of compound instructions with a first instruction for execution in the pipeline 208 and a second instruction for controlling the switching circuitry 224.

The switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on the data being dynamically routed (for example, in header information). A tile can send a message to any other tile by generating the appropriate address information in the message header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast (e.g., low latency) communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Figure 5B:
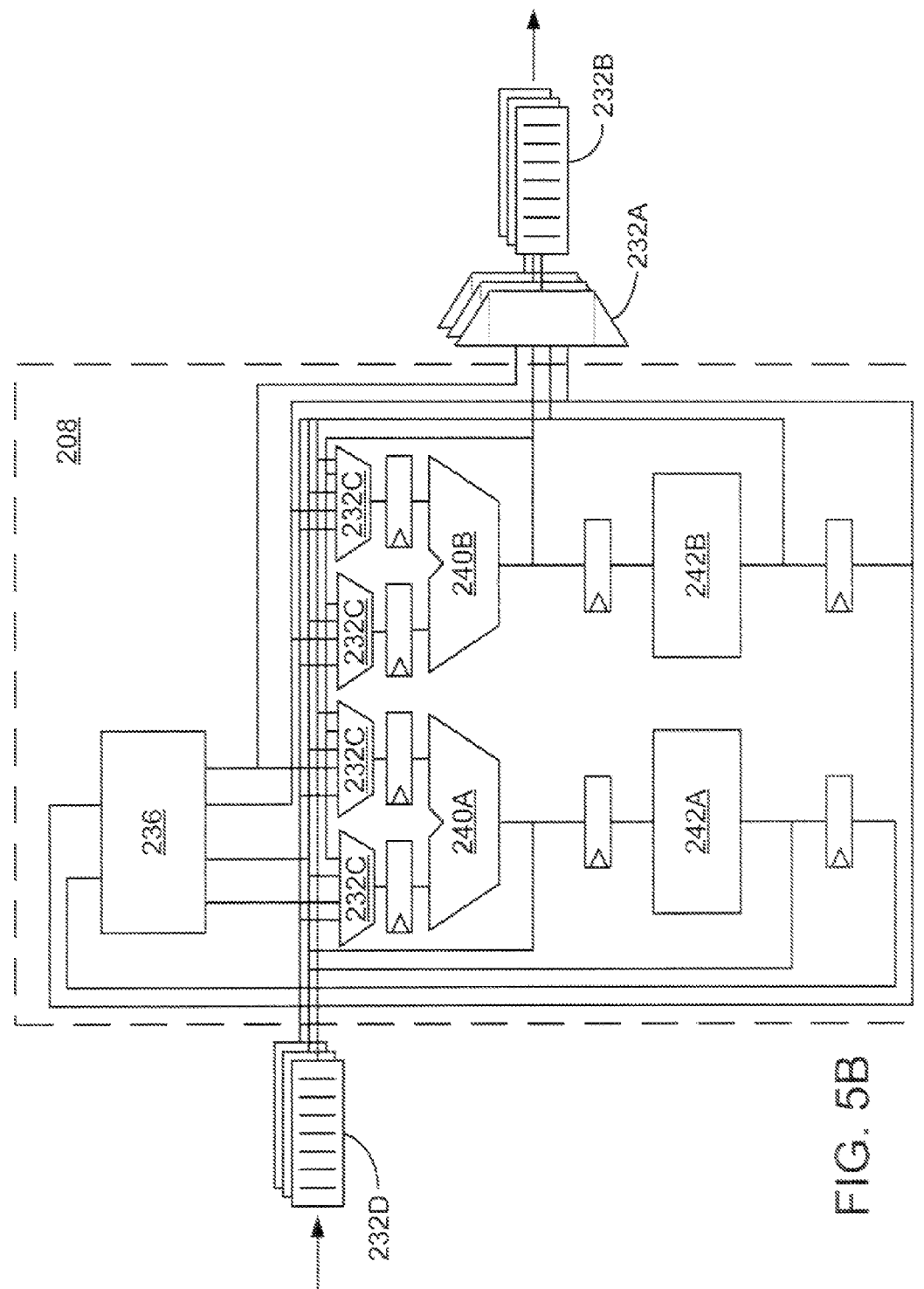
FIG. 5B is a block diagram of a pipeline.

Referring to FIG. 5B, a register mapped pipeline integrated switch interface 232 (FIG. 5A) includes a set of multiplexers 232A and output buffers 232B coupled to different output ports of the static or dynamic switch. The switch interface also includes a set of multiplexers 232C that select data from a register file 236 or any of a set of input buffers 232D coupled to different input ports of the static or dynamic switch. The multiplexers 232C feed the inputs to logic units 240A and 240B. The output buffers 232B and input buffers 232D are mapped to the name space of the register file 236. When the processor 200 (see FIG. 5A) reads from a register name mapped to a given switch port, data is taken from the corresponding input buffer 232D. When the processor 200 writes to a register name mapped to a given switch port, data is inserted into the corresponding output buffer 232B. The multiplexers 232A are able to select data from any pipeline stage (e.g., before or after the logic units 240A and 240B, or before or after functional units 242A and 242B) as soon as the value is available. If the processor 200 loads an instruction to read from an empty input buffer 232D or to write to a full output buffer 232B, the processor 200 will stall until it is able to proceed.

Figure 6A:
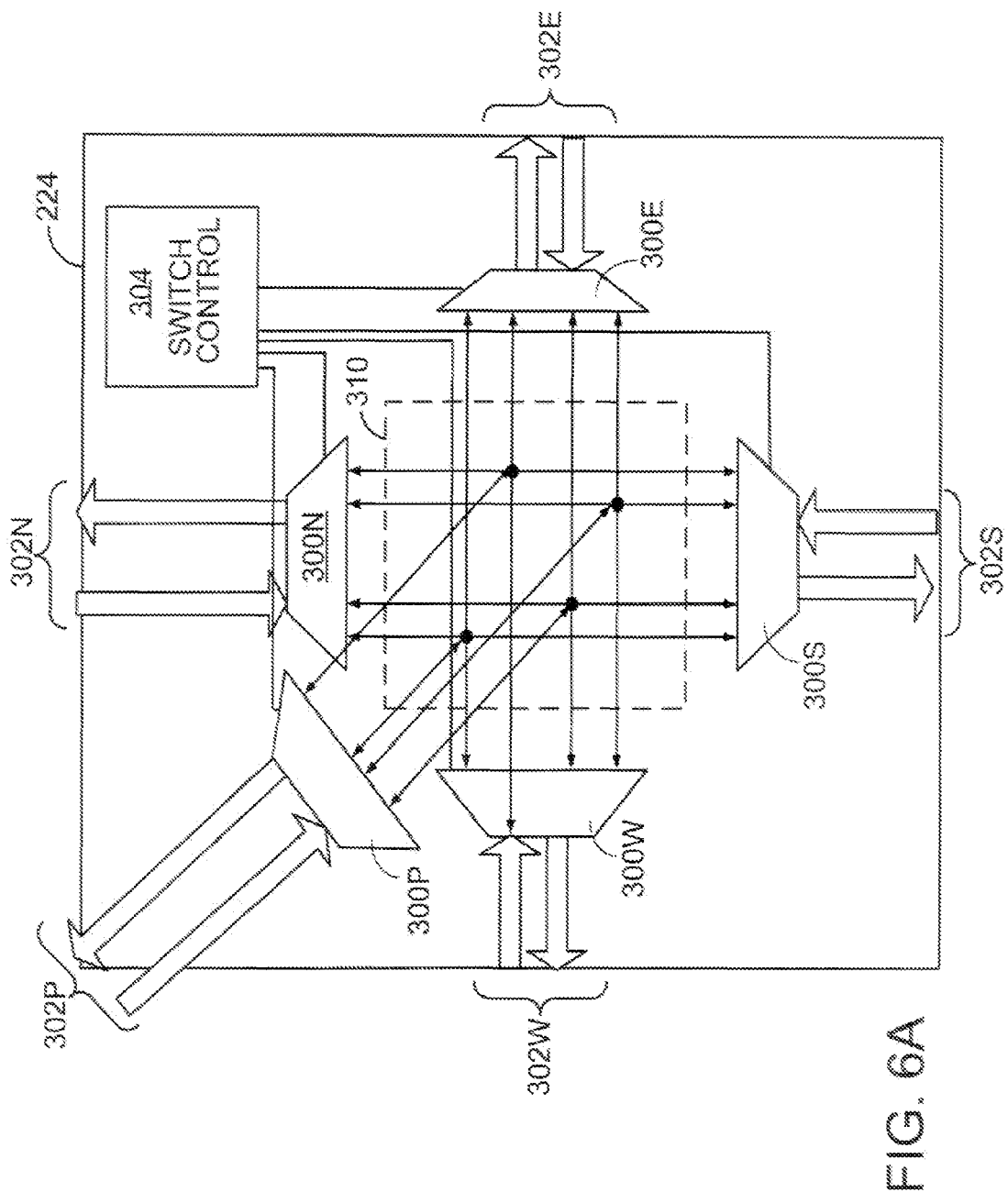

Referring to FIG. 6A, switching circuitry 224 includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A switch control module 304 selects which input port and output port are connected in a given cycle. The routing performed by the switch control module 304 depends on whether the switching circuitry 224 is part of the dynamic network or static network. For the dynamic network, the switch control module 304 includes circuitry for determining which input and output ports should be connected based on header information in the incoming data.

Referring to FIG. 6B, for the static network, the switch control module 304A of switching circuitry 224A includes a switch instruction memory 306 storing switch instructions that indicate which input and output ports should be connected. A switch instruction stored in the switch instruction memory 306 includes a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the switch instructions to perform actions such as branches or jumps based on program control flow. In a given clock cycle, the switch control module 304A can enable the multiplexers to move data independently onto any output port from any input port, including multicasting an input port to all output ports, as long as two input ports are not connected to the same output port in the same clock cycle.

The switch control module 304A is able to function as a switch processor with or without an ALU and registers. The switch control module 304A can include an ALU and registers to allow in-switch processing of in-flight messages. Optionally, the switch control module 304A can include other components such as a floating point arithmetic unit, or bit shifter, for example, to perform additional functions. In some examples, the switch control module 304A can be a VLIW-type processor and can be multithreaded.

Referring to FIG. 6C, a static network switch 320, which can be included in switch 220 in FIG. 5A, is configured in "single instruction mode." In single instruction mode, one instruction is used to control the multiplexers of the switch over many cycles. When data arrives at one switch input port, that data is routed according to the instruction stored in the single instruction buffer 322 independent of the availability of data a the other switch input ports. In this example, the switch 320 includes multiplexers 324 for turning single instruction mode on or off. The control signals for the multiplexers 324 are controlled by the processor 200 (e.g., mapped to a register name space of the processor 200).

When single instruction mode is on, data is routed according to the single instruction buffer 322. When single instruction mode is off, data is routed according to instructions in the switch instruction buffer 346. To save power in single instruction mode, switches are able to turn off circuitry such as a switch instruction fetch unit, and a switch instruction decode logic. Power can also be saved by reducing the size of the single instruction buffer 322 (e.g., to the size of a single instruction). In some implementations the size of the single instruction buffer 322 can be reduced to only enough bits to represent the coupling between the input and output ports (e.g., 2, 3, or 4 bits).

When utilizing single instruction mode, the individual output directions are independent of each other and there are no synchronization requirements. For example, if the single instruction specifies a route from north to south and a route from east to west, and data arrives on the east port, but no data arrives on the north port, the switch will route the data from east to west independent of data being available on the north or ports. With multiple static switches configured to use single instruction mode, the static network can be utilized to construct a dedicated physical channel across the integrated circuit.

The switches 220 include hardware and software mechanisms for providing flow control to ensure that data arriving at a full tile input buffer does not overwrite old data still pending in the buffer or cause deadlock. A switch 220 can include circuitry to detect full/empty states of buffers, and some of the wires in the data paths 104 of the static or dynamic network can be dedicated to communicating flow control information. In the dynamic network, the traffic patterns are unpredictable and there is a need for techniques for deadlock avoidance or deadlock detection and recovery. For example, buffers that become full can be overflowed into memory coupled to the switch 220 or the processor 200, or over one of the networks to off-chip memory. In the static network, the traffic patterns are controlled by the processing of switch instructions in a way that ensures correct delivery of data and avoids deadlock.

In a first approach to flow control for the static network, a processor 200 or switch 220 stalls if it is executing an instruction that attempts to read data from an empty input buffer 222 or from an empty processor output buffer 236, or send data to a tile with a full input buffer 222. This approach ensures correctness in the presence of timing variations introduced by dynamic events such as dynamic memory references and I/O operations.

In a second approach to flow control for the static network, the switch 220 can continue to process subinstructions of a macro switch instruction if data has arrived at the corresponding input buffers, and delay processing subinstructions if the corresponding input buffer is empty. The switch 220 is also notified that an input buffer at a connected tile that receives data from a given output port is full (e.g., via a full/empty bit). The switch 220 is able to continue processing switch instructions for other output ports while suspending only that output port.

In one implementation of this second approach, there is a switch instruction memory 306 (e.g., separate memory units or separate queues within a single memory unit) and program counter 308 for each output port to enable the switch 220 to operate independently on a separate stream of switch instructions for respective output ports. For example, the switch 220 can extract the instruction streams for respective output ports from an incoming macro switch instruction stream that includes subinstructions for the respective output ports. The condition code from a macro switch instruction can be included with each corresponding subinstruction of the extracted instruction streams. Alternatively, each subinstruction can include its own condition code based on the appropriate program logic. This second approach allows data that can be forwarded without sacrificing correctness to be forwarded without further delay.

2.2 Additional Circuitry

In some examples, a tile can include additional circuitry embedded within or coupled to the processor 200 and/or switch 220. The configuration of the circuitry in a tile can be controlled by local control information stored in the tile. For example, a module in the tile can be turned on or off or configured into a variety of modes based on the state of a "mode indicator" (e.g., one or more bits) stored in a register or other memory store.

A tile 102 can include various types of memory modules to serve as the instruction memory 204, data memory 206, or as a local memory store for other types of information such as control information for the tile. There can be a small SRAM bank in each tile in addition to a large SRAM bank. There can also be a larger DRAM bank in each tile. Each tile can have mode indicators used to select among these banks Any of the memory modules can be treated as a cache for a larger memory store outside the tile 102 or the integrated circuit 100. Such external memory (e.g., DRAM) is accessible over high bandwidth paths of one or more dynamic networks. The amount of memory can be chosen to roughly balance the areas devoted to processing and memory, and to match the memory access time and the processor clock.

A tile 102 can include Reconfigurable Logic (RL) that takes operands from registers and writes them back to registers after performing reconfigurable logic operations. The RL can be used for bit-level (or "gate-level") logic, and also for multi-bit-level (e.g., byte-level) logic. The operations performed by the RL can be specified by logic-level instructions supplied to the RL.

Functions such as virtual address translation, caching, global shared memory and memory protection can be implemented by any combination of hardware and software (e.g., processor instructions). A tile 102 can include a translation lookaside buffer (TLB) to translate virtual addresses as they come out of the processor 200 on each tile 102. A mode bit can turn off translation. The events such as cache miss or translation fault can trigger a trap or interrupt to the processor 200, so that the processor 200 can handle it in software. For example, there can be multiple trap lines to the processor 200. Alternatively, there are few trap lines, but there is a trap vector that the processor 200 can access which encodes the type of trap that occurred. There is a mode indicator which can allow selecting whether the software or the hardware handles these events. A hardware cache tag file can export a hit/miss status to the software rather than stalling the processor pipeline.

In a processor 200 in which the switch 220 is integrated into the bypass paths of the processor pipeline 208, the translation is performed before the data is sent (or committed) to the switch (e.g., before being written into a switch buffer to be sent out on any one of the static or dynamic networks). In this way, if there is a translation fault, then the data is not sent and the instruction can be safely aborted. Otherwise, data for which there has been a translation fault could corrupt program execution if sent over a network.

More generally, the processor 200 is configured to delay committing data associated with a current instruction or a subsequent instruction to the switch until an operation associated with the current instruction or a previous instruction has completed. In a case in which a subinstruction within a VLIW instruction triggers a TLB access, the processor makes sure that the TLB access completes successfully before any of the subinstructions in the same VLIW instruction or future instructions are allowed to write into a network. For example, the processor ensures that the TLB access of a memory subinstruction is completed without the TLB suffering a fault, before any subsequent subinstruction (or subinstruction in the same instruction as the memory subinstruction) is allowed to write into a network port. If the TLB does suffer a fault, then subinstructions that are being executed in the same cycle as the TLB access are stalled. Similarly, instructions that are happening in later cycles will also be stalled until the TLB fault is handled successfully. For other subinstructions for which data is available to be sent over a network before the subinstruction is guaranteed to complete successfully, the processor delays sending the data over the network until the instruction completes or is guaranteed to complete successfully. The data may be included as part of the subinstruction (such as a virtual address) or in some way dependent on the execution of the subinstruction.

The processor 200 is also configured to allow certain instructions (or subinstructions) to proceed while waiting for a previous instruction to complete. For example, one type of instruction that may be delayed several cycles before completing is a load instruction that retrieves data from a memory address in an coupled memory device over the dynamic network (e.g., due to a cache miss or a non-cached memory access). In some cases the load instruction may also write the retrieved data to a network port. The processor 200 can execute certain subsequent instructions while the data is being retrieved without causing errors due to incorrect program order. However, if a subsequent instruction also writes to a network port, the processor stalls to prevent that instruction's data from being injected into the network before data from the previous load instruction.

Thus, one criterion used by the processor 200 to determine whether to stall a pipeline is to ensure that the order in which values enter a network port corresponds to the order of the instructions (or subinstructions). In some cases, instructions are allowed to proceed without stalling the pipeline due to an incomplete instruction (e.g., a load due to a cache miss that does not target a network port). In some cases, the pipeline is stalled preventing instructions that target a network port from proceeding until a previous instruction completes (e.g., a load due to a cache miss that also targets a network port). However, independent networks can be configured to not block each other. For example, being stalled on writing one network does not necessarily stall writing to another network.

3 Tiled Circuit Programming Overview

A software system for the tiled integrated circuit 100 includes a compiler that is able to schedule instructions in both time and space by generating both processor and switch instructions for arranging the static network. The compiler can also prepare messages to be sent over the dynamic network. The combination of the static network and the pipeline integration enables the compiler to orchestrate a calculation to be performed over multiple tiles with fast register-level communication between tiles. The software system can exploit both coarse-grained parallelism and fine-grained Instruction-Level Parallelism (ILP). In addition, the software system can exploit reconfigurable logic in each tile to construct operations that are uniquely suited for a particular application. This reconfigurable logic can be coded in a hardware description language such as Verilog or VHDL, or in a high-level language such as C.

The operating system (OS) for the integrated circuit 100 can include a Linux-like kernel or a similar kernel running on a single tile 102. Alternatively, the OS can be a distributed OS running on multiple tiles sending messages to each of the processes on each of the tiles.

The compiler can leverage the architectural features of the integrated circuit 100 by partitioning and scheduling ILP or data-level parallelism across the tiles. The compiler is able to automatically parallelize sequential applications across multiple tiles 102. For example, outer loops can be parallelized at a coarse-grained while inner loops can be parallelized at a fine grain, much as in a vectorizing compiler. When the compiler can identify commonly occurring instruction patterns or bit operations, they can be configured into special operations that will run in a single cycle using the reconfigurable logic.

Figure 7:
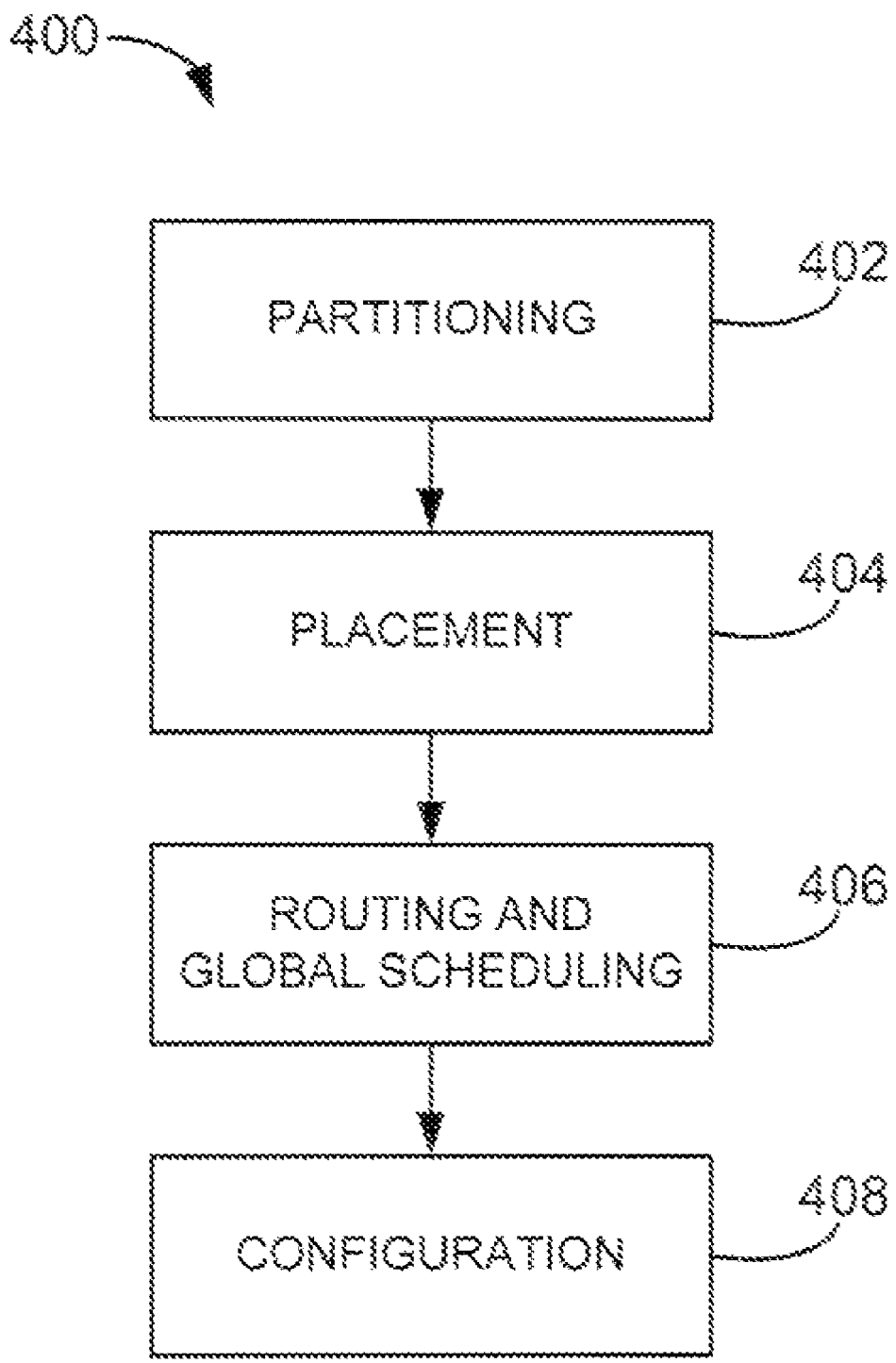
FIG. 7 is a flowchart for a compiling process.

Referring to FIG. 7, a compiling process 400 includes a number of stages. The compiler identifies and partitions for fine grain ILP in program by balancing the benefits of parallelism versus the overheads of communication and synchronization. In a partitioning phase 402, the compiler generates parallel code for a number of threads up to the number of tiles in the integrated circuit 100. In the partitioning phase 402, the compiler assumes an idealized fully-connected switch (an "ideal crossbar"), an unbounded number of virtual registers per tile, and symbolic data references. In a placement phase 404, the compiler removes the idealization of an ideal crossbar by selecting a one-to-one mapping from threads to physical tiles. The placement algorithm attempts to minimize a latency and bandwidth cost measure and can be, e.g., a variant of a VLSI cell placement algorithm. In a routing and global scheduling phase 406, the compiler allocates physical network resources with the goal of minimizing the overall estimated completion time of the program. The compiler output includes a program (e.g., a stream of instructions) for the processor 200 of each participating tile.

In an optional configuration phase 408, the compiler selects an application-specific configuration for reconfigurable logic to perform one or more custom operation. For each custom operation, the configuration compiler generates logic-level instructions for the reconfigurable logic and if necessary rewrites associated processor or switch instructions. For example, a compound operation involving multiple instructions is replaced by a call to the appropriate custom instruction using the reconfigurable logic. The compiler output includes a program (e.g., a stream of instructions) for each tile processor 200 and switch 220, and optional logic-level instructions.

Alternatively, the compiler can generate logic-level instructions based on a separate hardware description language program, as described in more detail below.

When the processor in the tile is able to exploit some amount of fine-grained ILP, for example, when the processor is a VLIW, multithreaded (CGMT, SMT, or FGMT), or superscalar processor, then the compiler has an additional challenge. In some cases the compiler schedules the available parallelism (e.g., ILP) across (1) several tiles, and (2) across the parallelism of afforded within a single tile (for example, over multiple functional units). When compiling instructions for an integrated circuit that includes tiles with VLIW processors, for example, the compiler is able to schedule the instructions in the VLIW processor within a tile at the same time that it is scheduling instructions across multiple tiles. The compiler is able to make a tradeoff as to where to schedule a given instruction—on the same tile using VLIW parallelism, or on another tile using inter-tile parallelism, for example. The compiler can do so, for example, by modifying the partitioning phase discussed previously. Instructions that are in the critical path of the program can be assigned to a single tile. Instructions that feed operand values directly into any of the instructions in the critical path, or instructions that consume operand values produced by critical path instructions, can be placed on the same tile to exploit VLIW parallelism. Instructions that are further away from the critical path instructions, or instructions on a different critical path can be placed on another tile. In general, code scheduled for a VLIW tiled architecture will result in fewer tiles being used than in an architecture that executes only one instruction in a given cycle.

4 Additional Features

4.1 Pipeline Integration

In general bypass paths in pipelines short circuit values from one pipeline stage to another without the need to transmit the values to the register file or to memory each time. The bypass paths in a processor are thus critical resources for shuttling values around between various stages such as ALUs, register files, load-store queues, writeback stages, and so on. As described above, a register mapped interface is able to integrate the switch 220 into the bypass paths of the processor pipeline 208. Register mapped interfaces allow the processor 200 to use register names to refer to buffers that couple data into or out of the static or dynamic networks. Values may be coupled from a processor bypass path to a switch output port, or values may be read from the switch into the processor bypass paths.

Integration of the switch 220 into the bypass paths of the pipeline 208 enables the values that are destined to the switch 220 from the processor 200 to be picked directly from the processor pipeline 208 as soon as they are produced. For example, data values from the pipeline 208 can be sent to switch buffers 232B directly from the processor's bypass paths, even before the values are written to the register file 236 (FIG. 5B) at a writeback stage.

If values going to the network are ordered, care should be taken when choosing which value to forward to the network in any given cycle. If "long-latency" instruction that requires the whole pipeline to compute writes to the network, and it is followed by a "short-latency" instruction that also writes to the network, but requires fewer pipeline stage to compute, then to preserve ordering of values to the network, the value from the short-latency instruction is delayed from reaching the network until the long-latency instruction has written to the network. Control logic is used to determine which value in the pipeline that targets the network is the oldest to preserve ordering of values going to the network. It is possible to use a reordering buffer or a unordered network to relax this strict ordering requirement.

The pipeline integrated switch enables a value computed by an ALU of a given tile to be used as an operand in a neighboring tile's ALU with extremely low latency, e.g., in 1 to 3 cycles, as opposed to 5 or 10 cycles, which might be the case if the value was picked from the pipeline in the writeback stage of the pipeline. This low latency transfer of single word operands between tiles is an important aspect of enabling an ILP (instruction level parallelism) compiler to compile programs written in sequential C, C++ or other high level languages to multiple tiles.

Register file size can be increased from the size used by other processors (which may have 8 to 32 registers), for example, to 64 or more registers, because some of the register name space is used up to name switch buffers.

In VLIW processors, multiple subinstructions in a macroinstruction may attempt to read or write to the switch buffers. If multiple subinstructions in a macroinstruction try to write to a register name mapped to the same switch buffer, there is a potential conflict. The compiler can avoid such conflicts in scheduling the VLIW instructions. Alternatively, the tile can serialize multiple writes into the switch buffers allowing the writes to take place sequentially without a conflict, as described in more detail below. Multiple instructions in a macroinstruction are able to read from the same switch buffer without a conflict.

When an outgoing value is coupled from the processor 200 to the switch 220, the processor instruction may include a switch register specifier denoting one of several output registers. The specified output register may be linked to a static coupled switch (with the OD mode indicator set to coupled mode), a static decoupled switch (with the OD mode indicator set to operand decoupling mode), or to a dynamic network switch.

For increased speed, the switch register specifier is able to directly specify a register of a neighboring processor. A direct name identifying the register can be included, or there can be a directional mode indicator in the instruction that allows the register name to be interpreted based on the name space of a neighboring tile. For example, a directional mode indicator can be 2 bits corresponding to a register in a tile in the east, west, north, or south direction. Directional mode indicators allow the name space of a register specifier to be inferred to be that of a neighboring tile. Particularly for a slow clocked system, it is useful to avoid a multi-hop near neighbor latency by using a directional mode indicator to enable a single-hop communication event from one tile to a neighboring tile.

Alternatively, instead of sending a processor value to a register on the same tile using a register specifier, or to a neighboring or other tile's register or ALU, a processor value can be sent to a memory using a memory specifier, or to an I/O port using an I/O specifier.

When an incoming value is coupled from the switch to the processor, the processor instruction may include a register specifier denoting one of several input registers from the switch. These input registers serve to synchronize the processor pipeline with the switch even if the switch is running in decoupled mode. There can be more input ports than just the 4 directions (north, south, east, and west). For example, there can be multiple networks, and there can also be communication paths forming "hyperlinks" that skip multiple tiles.

Another mode indicator called the Processor Switch Coupling (PSC) mode indicator indicates whether program counters of the processor 200 and switch 220 are to be coupled. If this PSC mode indicator is set, the processor and the switch program counters are coupled and the two are incremented synchronously. For example, both the processor and switch pipelines are stalled if either is stalled.

It is useful for some of these mode indicators, in particular, the directional mode indicators, to be linked to the clock speed of the integrated circuit 100. For example, a given mode may be more appropriate for a given clock speed. In some cases, a tile is allowed to transfer data over hyperlinks to non-neighbor processors (e.g., by allowing a compiler to have visibility of the hyperlinks) only when the clock speed is lower than a predetermined rate. This is because hyperlinks to tiles, which are normally two or more hops away in a two dimensional (east, west, south, north) mesh network, will traverse longer data paths. Data that traverses a longer data path will take longer to reach its destination. Therefore, in some cases, these longer delays limit the integrated circuit 100 to operating with slower clock speeds when hyperlinks are used than the clock speeds that may be available when hyperlinks are not used. In some implementations, the clock speed of the integrated circuit 100 is itself controlled by one or more mode indicators.

4.2 Direct Memory Access

The static and dynamic networks transport data among buffers in the switches. The buffers are used as first-in-first-out (FIFO) queues that are able to pour data into various sinks on the tile, or receive data from various sources on the tile. The processor 200 on a tile can be a source or sink of data to or from a buffer in the switch in the same tile or in a neighboring tile. For example, a buffer can be coupled to a register that the processor 200 can write to or read from. In some cases, a processor 200 may read a data word from the switch buffer and execute an instruction to store that data word in memory (e.g., either in a local cache in the tile, or in a memory external to the tiles 102 via the dynamic network).

In other cases, a larger amount of memory (e.g., multiple words) may need to be stored in memory. In some examples, each tile includes a DMA engine. Using a direct memory access (DMA) approach, a block of data including multiple words can be stored in memory without requiring the processor to execute an instruction to store each word of the data (or each segment of data greater than a cache line). The processor executes one or more instructions to set up the DMA transfer for outgoing DMA. For example, the processor writes a start address and an end address of the data block to be transferred into one or more registers. Alternatively, the processor writes a start address and the size of the data block into registers.

A DMA controller in the tile transfers the data in the background without processor intervention, enabling the processor to execute other instructions during the DMA transfer. At other tines, such as during a cache miss, the size of data that is sent into the cache of a tile without processor intervention is limited to one cache line (e.g., around 16 to 128 bytes). The size of the data block transferred in a DMA transfer can be much larger than a cache line (e.g., 4 Kbytes). This DMA approach can be indicated by control information within the data (e.g., the data can contain a DMA tag that determines whether the data is destined for a register (to be handled by the processor 200), or for direct memory transfer. In the static network, the tag can be appended to the data. In the case of the dynamic network, since the data is in the form of a packet with a header, the tag can be included in the header.

If the DMA tag is set, the data arriving at the switch of a destination tile is deposited into a DMA queue and the data is passed directly into a cache or static memory without involving the processor 200. If the DMA tag is not set, the data is put into a FIFO coupled to the registers of the processor 200. The value of this twofold processing is that when the data is to go into memory, the processor does not have to be involved in the receipt of the data. The DMA tag is set by the sender of the data.

In an alternative implementation, the DMA tag is not contained in the data (or its header), rather there is a mode indicator called the DMA mode indicator in the appropriate network port (or in the tile). If this DMA mode indicator is set, then the data is directed to memory.

4.3 Multiple Processor Instruction Streams

There are a variety of ways in which a tile 102 is able to process multiple instruction streams. A tile 102 is able to process an instruction stream for the processor 200 and an instruction stream for the switch 220. In the operand decoupling mode described above, the switch 220 processes multiple instruction streams (e.g., derived from a macro instruction stream) using multiple program counters to switch data for multiple output ports independently. These separate processor and switch instruction streams provides a form of concurrency in which a tile can execute computations and switch data in the same clock cycle.

In another form of concurrency, some or all of the tiles can include a processor 200 that is configured to process multiple instruction streams. The multiple instruction streams can be derived from a common macro instruction stream such as in a VLIW processor, or can be provided as separate threads. The processor 200 can include multiple logic units that process a corresponding one of the instruction streams, based on a common program counter as in a VLIW processor, or based on separate program counters as in a multithreaded processor. The processor 200 can also include multiple register files each associated with a corresponding one of the instruction streams. These multiple processor instruction streams provide a form of concurrency in which a tile can execute multiple computations in same clock cycle.

The multiple logic units can include, for example, one or more of an arithmetic logic unit, an arithmetic unit, a multiply accumulate unit, a multiply add unit, a vector unit, a load or store unit, or a branch unit. The logic units can also include units that interact with the switch, such as a switch read unit, which reads data received by the switch, or a switch write unit, which stores data that is to be sent over the switch. For example, a switch write unit can include a FIFO buffer or a register.

Figure 8A:
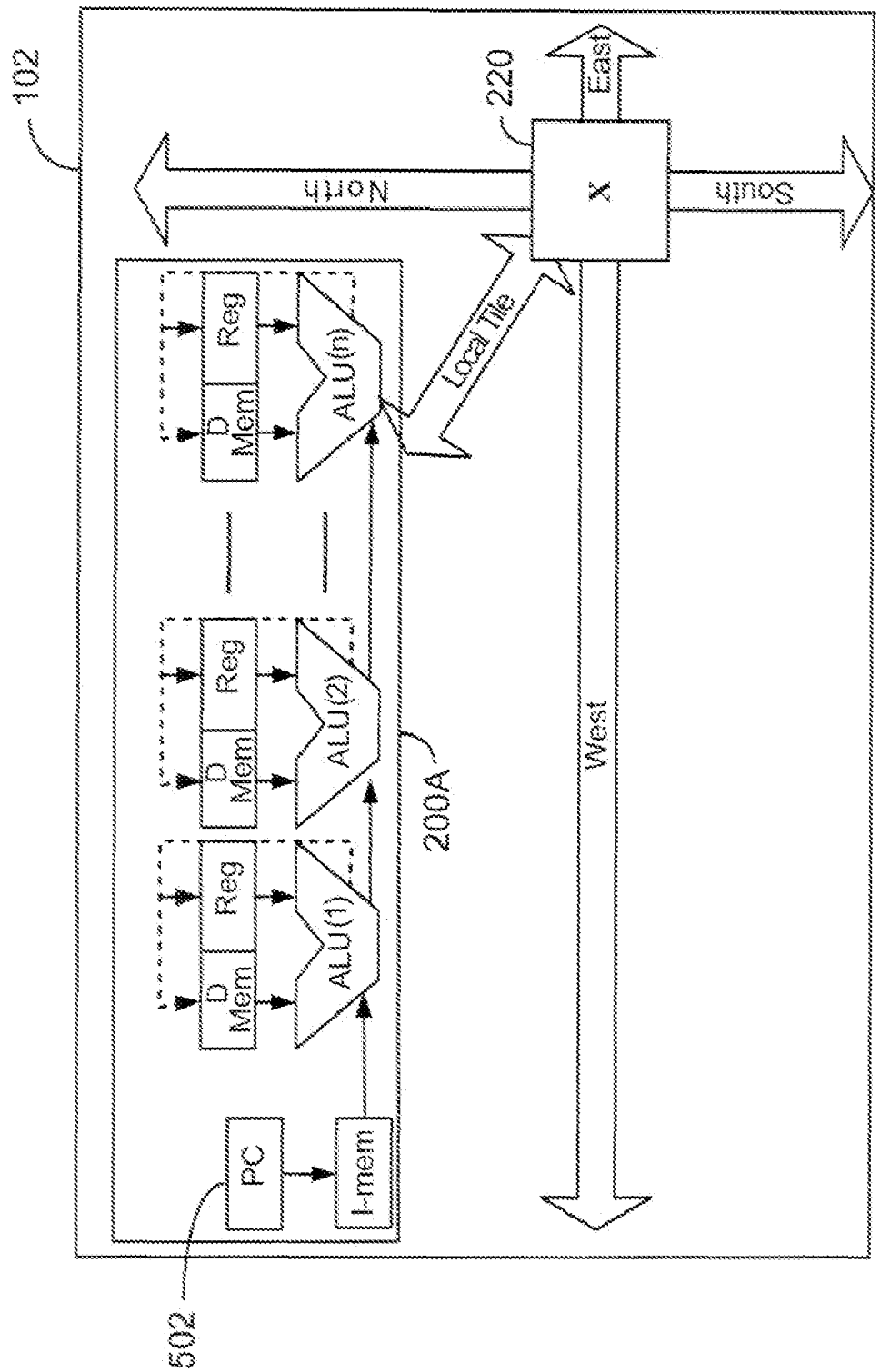
FIG. 8A is a block diagram of a VLIW processor.

In the case of a VLIW processor, the processor 200 is configured to execute instructions taking into account interactions with the switch 220. For example, the subinstructions of a VLIW instruction are executed together; therefore, if some subinstructions are reading from or writing to a port of the switch, the processor may need to stall execution of the VLIW instruction if a subinstruction is temporarily unable to read from or write to a port of the switch. FIG. 8A shows an example of a tile 102 including a VLIW processor 200A having n ALUs (ALU(1)-ALU(n)) that operate based on a common program counter 502.

Figure 8B:
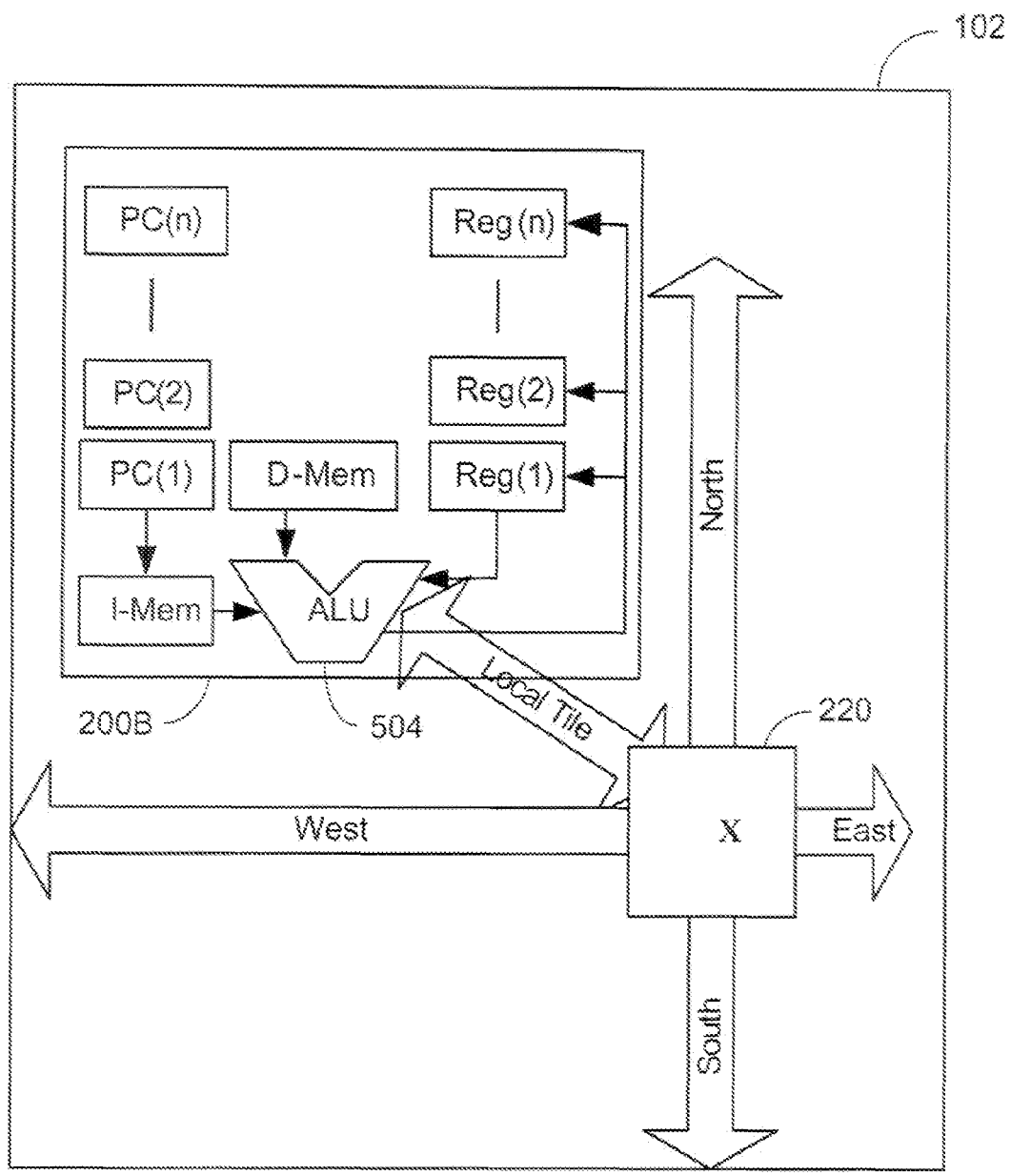
FIG. 8B is a block diagram of a multithreaded processor.

There can be a long latency associated with certain tasks such as accessing memory, sending data across the network, an synchronizing multiple tiles. When one thread of a multithreaded processor is executing an instruction involving one of these tasks, another thread can perform another task so that the latency associated with those tasks are overlapped. FIG. 8B shows an example of a tile 102 including a multithreaded processor 200B having n program counters (PC(1)-PC(n)) and n register files (Reg(1)-Reg(n)) that can be selectively coupled to an ALU 504 so that when one thread is waiting on a long latency event, the processor 200B switch to a new thread in a new context, characterized by a different program counter and register file.

Figure 8C:
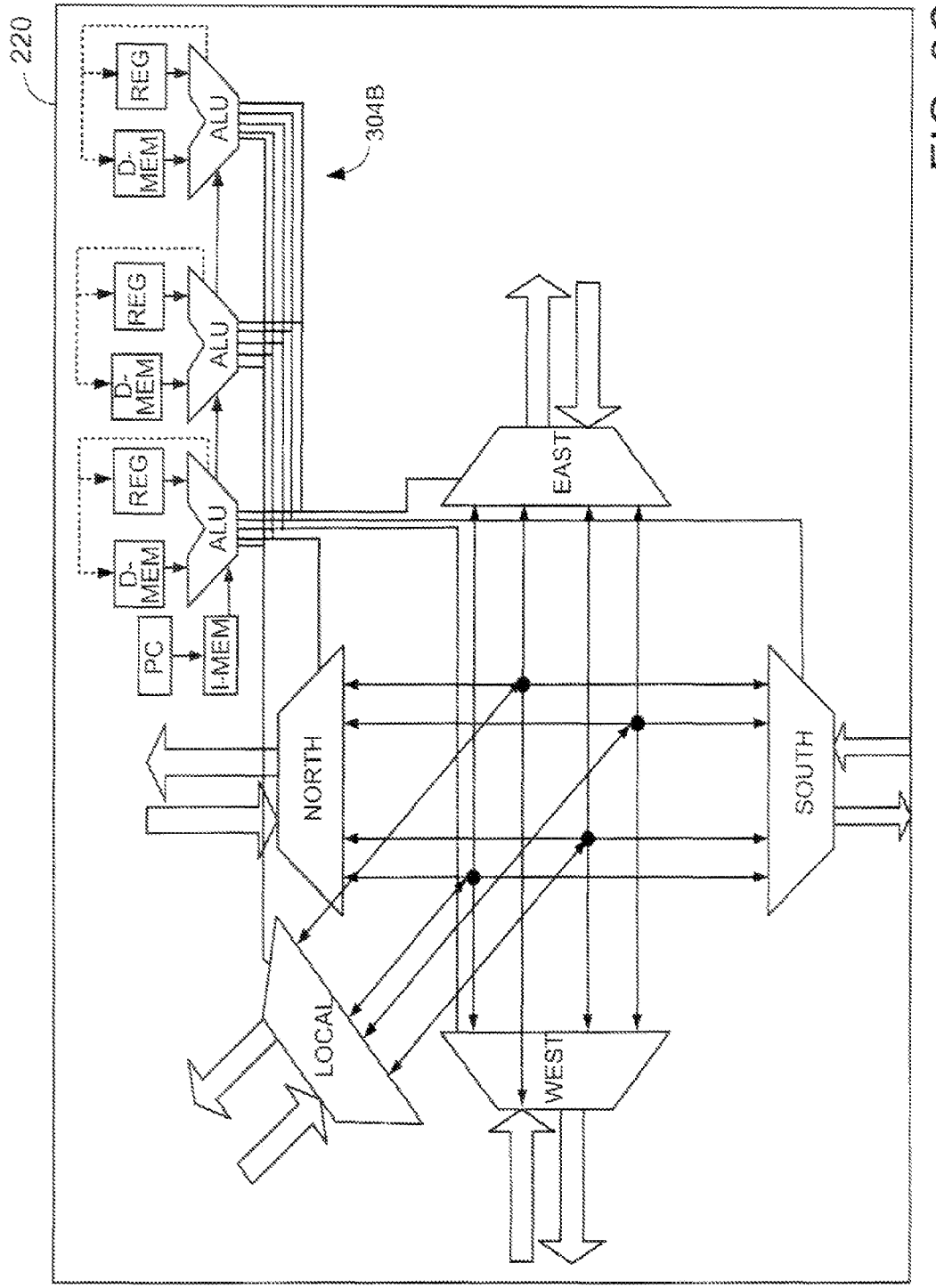
FIG. 8C is a block diagram of a VLIW switch processor.
Figure 8D:
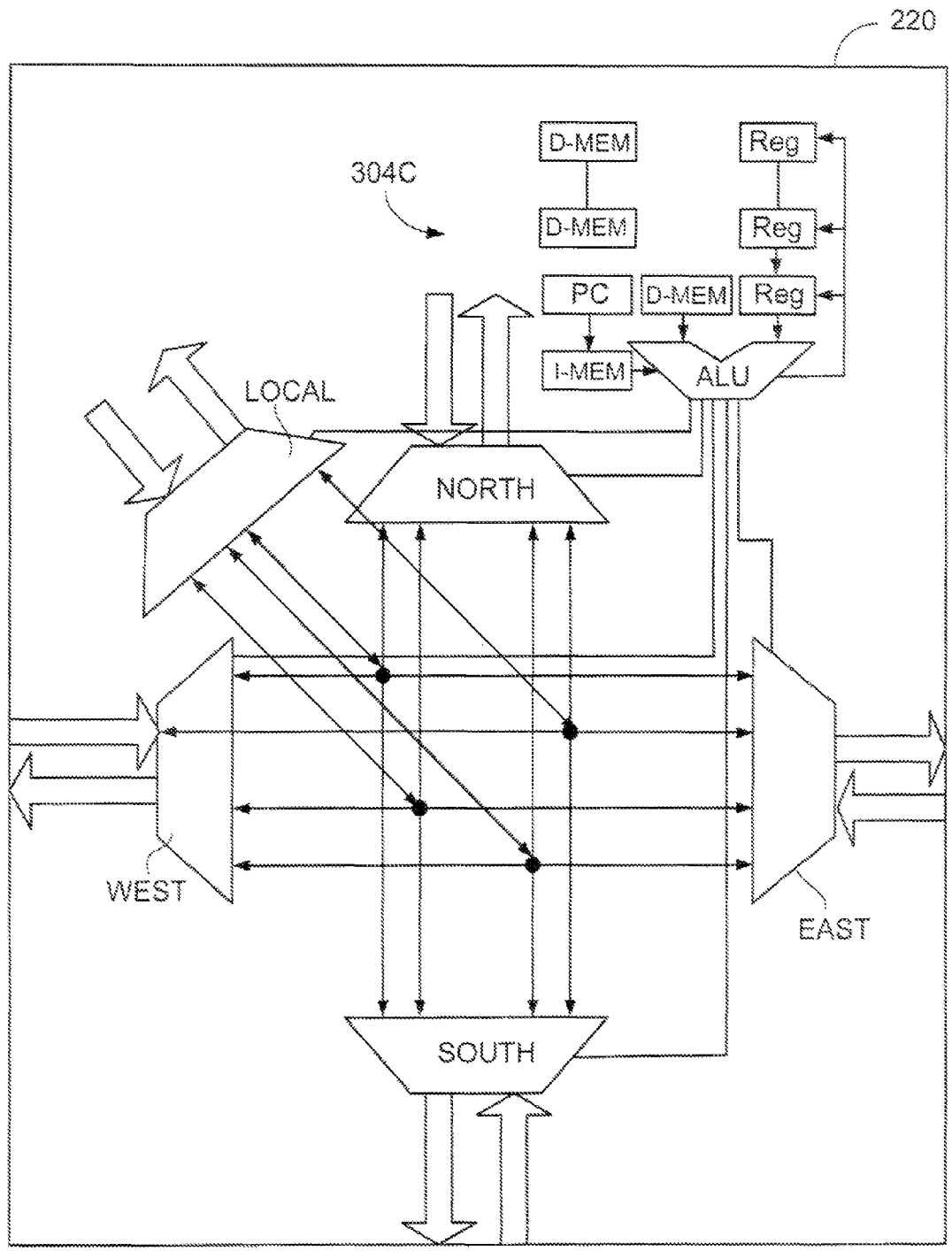
FIG. 8D is a block diagram of a multithreaded switch processor.

A switch processor can also be a VLIW processor 304B or a multithreaded processor 304C, as shown in FIGS. 8C and 8D, respectively.

When a compiler partitions a program into subprograms to execute in a tiled integrated circuit having VLIW or multi-threaded processors in the tiles, the compiler generate parallel code for a maximum number of threads larger than the number of tiles in the integrated circuit 100 (e.g., up to four times the number of tiles if each tile has a VLIW processor with four subinstructions).

In the partitioning phase, the compiler partitions a program into sets of instructions that are able to be executed in parallel. For example, the compiler uses a graph to indicate which instructions can be executed in parallel. In the placement phase, the compiler maps the sets of instructions to tiles. The compiler determines in which tile each of the sets of instructions is to be executed is based in part on critical path information from the graph to determine which instructions to run in the same tile, and which to run in separate tiles. One or more of these sets of instructions selected to run within the same tile represent a subprogram for the tile.

Thus, a subprogram for a tile may include multiple sets of instructions that can be executed in parallel threads within the tile. For example, in a VLIW processor, for those sets of instructions selected to execute on the same tile, the compiler determines instructions within the sets of instructions that will run in parallel in the same VLIW macroinstruction. The compiler determines instructions for a macroinstruction based in part on information characterizing which functional units (e.g., ALUs) are available to be used in parallel to execute a macroinstruction.

5 Dynamic Networks

As described above, the switches 220 include dynamic network circuitry for routing packets of data based on a destination address in the header of the packet. The payload of a packet includes a message or a portion of a message that is delivered to the tile at the destination address. Packets can have a fixed length, or a variable length. In one approach to variable length packets, a packet can vary in length from one word plus a header word, up to 127 words plus a header word. The header word contains a field that determines the length of the packet.

The switch control module within a tile controlling the dynamic switch (e.g., a dynamic switch processor) performs functions for transmitting, routing, and receiving packets. In some cases, the control module in a receiving tile processes multiple packets to recover a message that is larger than the maximum packet size. For example, the control module in the transmitting tile segments the message among payloads of multiple packets. The control modules in the tiles along a route between the sending and receiving tiles route the segments in the order in which they are received. The control module in the receiving tile reassembles the message. This segmentation and reassembly can be controlled by a communication protocol in software running in a dynamic switch processor of a transmitting or receiving endpoint tile, or in software running in the tile's main processor 200. In other cases, the atomicity afforded to data by packetization enables data associated with an atomic transaction to be transmitted in the payload of a single packet to ensure that the data will not be interrupted by other packets.

The tiles can include circuitry for multiple independent dynamic networks. The different dynamic networks can each be dedicated to handling a particular type of traffic. For example, one dynamic network handles traffic associated with a user, called the User Dynamic Network (UDN). Another dynamic network handles traffic associated with the operating system and is primarily used to communicate with input and output devices, called the Input/Output Dynamic Network (IODN). Another dynamic network handles enables tiles and I/O devices to interface with copious memory (e.g., DRAM coupled to the network), called the Memory Dynamic Network (MDN).

In one approach to deadlock recovery, described in more detail below, the MDN is used in a specific manner to guarantee that deadlock does not occur on the MDN. The MDN is also used for inter-tile memory traffic (e.g., to a tile's data cache). Data can be coupled to the MDN by the processor 200 in the tiles, or by a DMA interface in the tiles. The DMA interface can be coupled to one or more of the other networks as well.

The control module handles routing data from a sender to a receiver. Routing includes processing a destination identifier to determine a route the data should traverse to the receiver. In some implementations, the dynamic networks have a two-dimensional topology and use dimension-ordered worm-hole routing. The dimension-ordered nature of the networks means that packets on the network follow a deterministic routing path, for example, first along the "x" dimension (e.g., East/West) and then along the "y" dimension (e.g., North/South) in a two-dimensional network.

Figure 9:
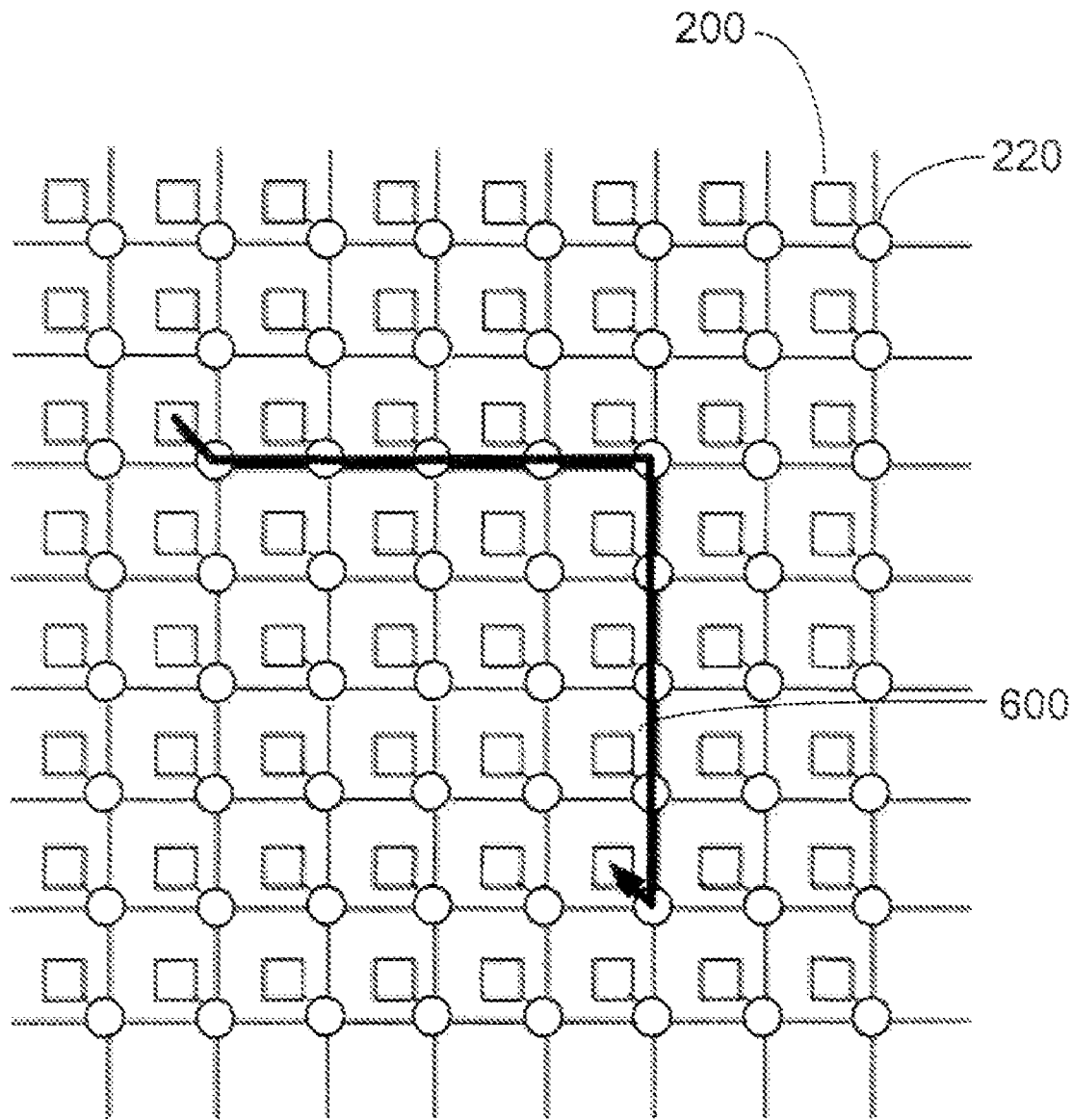
FIG. 9 is a block diagram of a route through an array of tiles.

FIG. 9 shows the path 600 taken by a packet sent from the tile at coordinates (1,2) to the tile at coordinates (5,6). As in the static network, each clock cycle one word of data traverses a link from one tile to a neighboring tile. The head word of the packet (e.g., the header) worms through the network and reserves links between the intermediary switches along the route. Subsequent words of the packet up to the tail word continue to worm through the network along the same path set up by the head word. The tail of a packet worms through the network and clears the path for use by other packets. As the tail traverses the network, it clears up a path for other packets to use reserved links. Wormhole networks are named as such because packets appear to worm through the network. One reason that wormhole networks are advantageous is that they reduce the amount of buffer space needed in the switches.

A packet reaches its destination tile when both the x and y coordinates match the coordinates of the destination tile (e.g., stored in a register loaded when the system boots). Alternatively, the packet header can contain the number of hops in the x dimension as a $\Delta x$ count and the number of hops in the y dimension as a $\Delta y$ count. In this scheme, the value of $\Delta x$ is decremented after each hop in the x dimension, and the value of $\Delta y$ is decremented after each hop in the y dimension, and the packet reaches its destination when $\Delta x$ and $\Delta y$ become 0.

After a packet reaches the destination tile, the packet is then sent to a final destination (which can also be indicated in the packet header). The final destination can direct data to an off-tile location over a network port to the north, east, south, west, or can direct the data to a functional unit within the tile, such as the processor or an on-tile memory unit or functional unit. This final destination routing enables data to be directed off of the network to an I/O device or memory interface, for example.

The final destination can be encoded in multiple bits, for example, indicating a direction in 2-dimensions (north, east, south, west) corresponding to a port that leads out of the tile array, or higher than 2-dimensions (e.g., up or down). The final destination can also be encoded in a single bit, for example, indicating a either default final destination on the tile (e.g., the processor), or a default destination off of the tile (a predetermined "external port" that leads off the edge of the tile array).

The final destination can also be indicated by a combination of information in the packet and information stored in the tile (or otherwise accessible to the tile's switch). For example, in the case in which the final destination information in the packet is a single bit, the final destination information stored in the tile can indicate one of multiple on-tile locations (the processor or a DMA engine), or one of multiple off-tile locations (one of the two external ports of a corner tile).

5.1 Local Link-Level Flow Control

Reliable data delivery is achieved in the dynamic network using flow control to ensure that data is not lost or dropped when being routed in the network. Local or "link-level" flow control ensures that data is lost or dropped over a link between two tiles (e.g., due to limited buffering at a switch). Global or "end-to-end" flow control is used to further control the rate of data delivery between a sending tile (the "sender") and a receiving tile (the "receiver"), and is described in more detail below. Link-level flow control is not in general sufficient to provide end-to-end flow control due to the possibility of deadlock, (in this case, for example, due to limited buffering at a receiving tile at the end of a route) also described in more detail below.

One aspect of flow control includes managing the dynamic switch input buffers. Backward pressure is used to prevent a sending switch from sending further data if the input buffer at the receiving switch is full. This type of flow control is also called "backward flow control."

A first approach to implementing link-level flow control includes a signal sent from the receiver to the sender (e.g., over a dedicated wire) indicating that a particular input buffer is full, and that the sender should not send more data over the link. This "full signal" should be generated and sent to the sender quickly to reduce the delay in the critical path of link-level flow control.

A second approach to implementing link-level flow control is a credit-based approach. In this approach, the sender does not need to receive a signal from the receiver that buffer space is available (the buffer is not full) each time data is sent. In the credit-based approach, each sender maintains a count of the remaining space in the receiver's input buffer. As data is sent over a link, the sender decrements the count. When the count reaches zero, there is no more space in the input buffer and the sender is barred from sending data over the link. As data is read out of the input buffer, the receiver sends credits to the sender. The sender increments the count for each credit received.

In the credit-based approach, dynamic switch circuitry can be pipelined and can maintain full speed switch throughput. The size of the input buffer and associated credit counter are selected appropriately to account for the latency needed to send a credit from the receiver to the sender and to determine whether to send any further credits.

Figure 10:
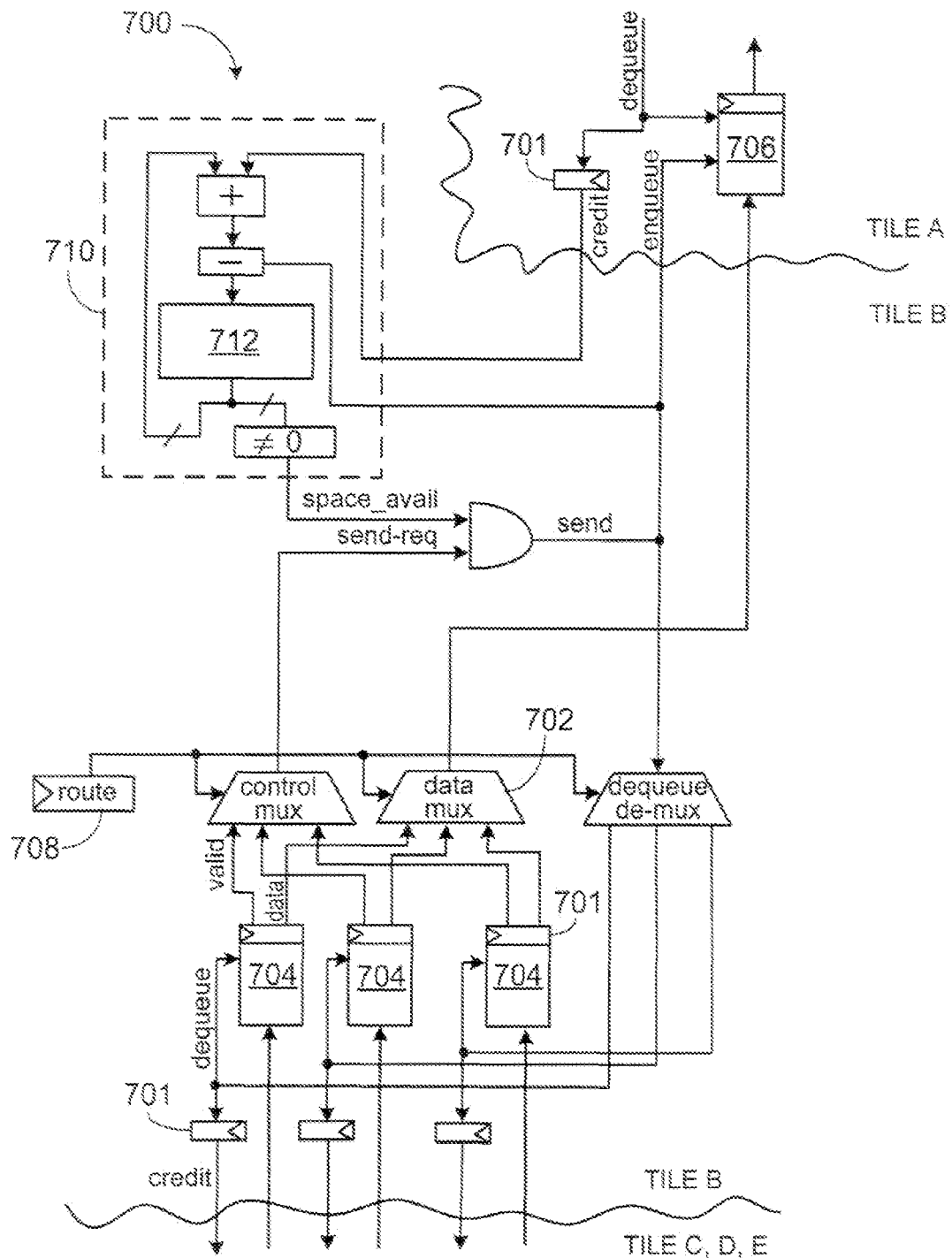
FIG. 10 is a block diagram of switching circuitry.

Referring to FIG. 10, switching circuitry 700 for a credit-based approach switches data among input buffers that each store up to 3 words of data corresponding to the arrangement of pipeline registers 701. The switching circuitry 700 is a portion of the dynamic switch that controls the flow of data from a sender tile_b to a receiver tile_a. The sender tile_b includes a data multiplexer 702 that selects a data word from input buffers 704 to send to the input buffer 706 of the receiver tile_a, according to route information stored in a route register 708. The route information is generated based on the headers of incoming packets. The sender tile_b includes an input buffer for each of the tiles to which it is connected (tile_a, tile_c, tile_d, tile_e, . . . ). However, since the switching circuitry 700 controls the flow of data to tile_b, the data multiplexer 702 does not necessarily need to be able to pull data from tile_b. Corresponding circuitry is used to control the flow of data from the sender tile_b to other tiles to which tile_b is connected.

Control circuitry 710 counts credits in a credit counter 712 corresponding to input buffer space available in the receiver tile_a. If there is at least one credit and an input buffer has data to be sent, the control circuitry 710 will assert a signal to dequeue data from the appropriate one of the input buffers 704 and enqueue the data to the input buffer 706. Otherwise the control circuitry 710 will stall, not sending any data to the receiver tile_a.

The credit counter 712 tracks available storage space in the input buffer 706 to ensure that the input buffer 706 will not overflow. However, the number of credits stored in the credit counter does not necessarily correspond to the actual amount of available buffer space in the input buffer 706 at that time since the control circuitry accounts for data that may flow into the input buffer 706 from pipeline registers.

The switching circuitry 700 also includes a mechanism to facilitate context switching in a tile. When one tile is entering a state in which no data should be received (e.g., performing a context switch, or entering a low-power mode), that tile is able to signal each neighboring tile to stop sending data using a "stop signal" transmitted over a wire between the tiles. For example, tile_a can assert a stop signal line 720 to override any remaining credits that would otherwise enable tile_b to keep sending data.

5.2 Register Mapped Network Communication

As described above, in some examples the dynamic networks are able to transfer data to and from the main processor through a register mapped interface. When the main processor reads a register corresponding to a particular network, the data is dequeued from the respective network input buffer. Likewise, when a register associated with a particular network is written by the processor, the data is directly sent out of a corresponding network output port.

The register mapped networks are both read and write flow controlled. For instance, if the processor attempts to read from a register connected to a network and the data has not arrived yet, the processor will stall in anticipation of the data arriving. Outbound data communication can also receive backward pressure from the networks to prevent it from injecting into the network if the network buffer space is full. In this case, the processor stalls when the outbound buffer space is full for a particular network.

For efficient register mapped communication, the dynamic networks are integrated closely into the processor's pipeline. In effect, they contribute to the scoreboarding in the processor, and the processor maintains correct output ordering across variable length pipelines. One possible implementation of this register mapped communication is via integration of the input or output buffers into the bypass network of the processor pipeline. By doing so, for example, a value going out from the ALU in a pipeline can go to the switch on an immediately following cycle, and well before the pipeline writeback stage (which is the "pipeline commit stage" in some pipelines) when the data value is written into the register file. In the case of the tiled integrated circuit in which pipelines are coupled via a switch network, the pipeline commit stage is the earlier stage (generally earlier than the writeback stage) in which a value can be injected into the network. This is called an early commit pipeline. Also, in order to reduce latency, it is desirable to expeditiously forward a value to the network as soon as the value is computed. In order to accomplish this, an implementation may contain a forwarding network which chooses the oldest completed information in the pipeline to forward out to the network.

6 Tile Architecture

Figure 11:
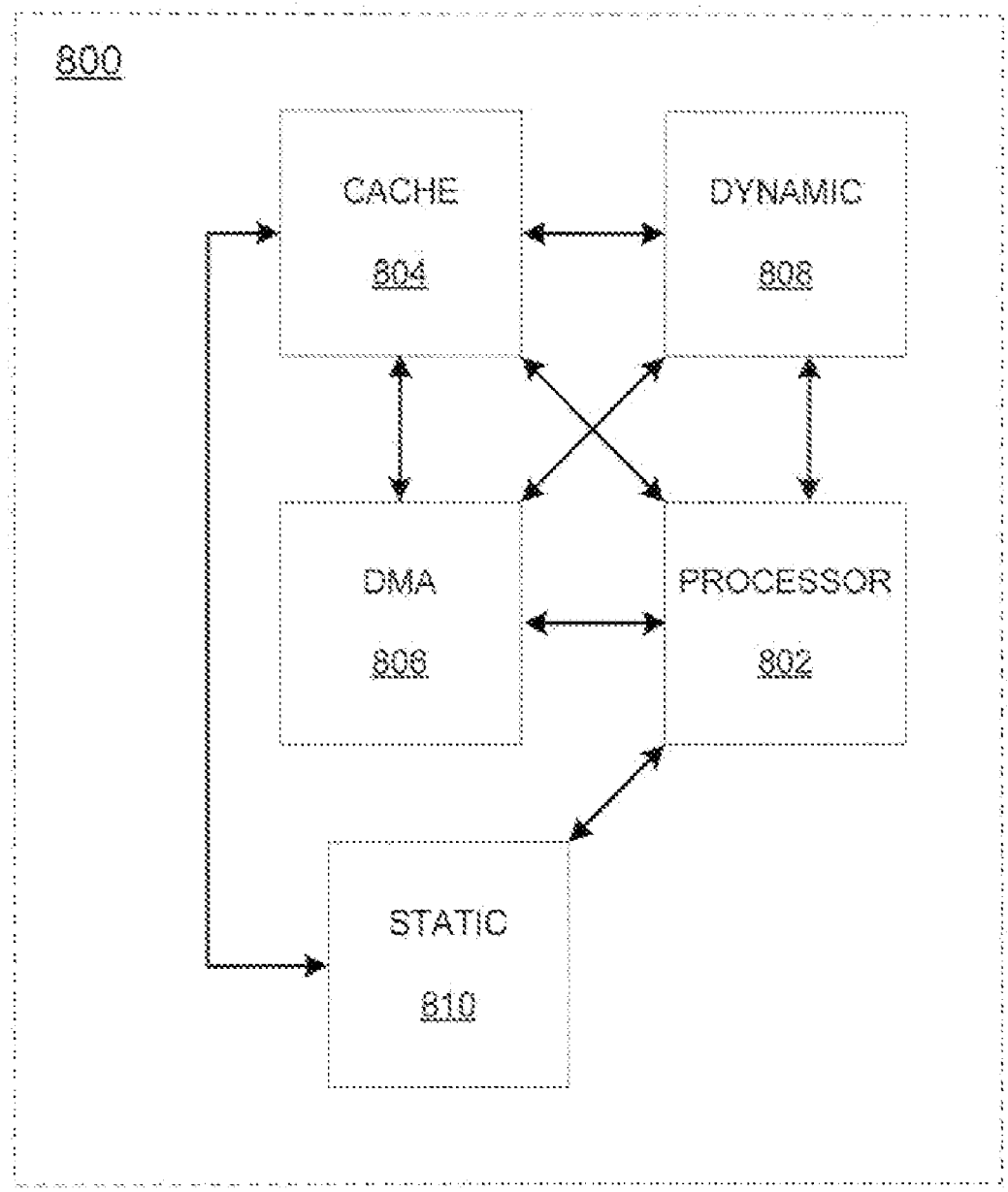
FIG. 11 is a block diagram of integrated circuit modules.

FIG. 11 is block diagram showing the relationships among the functional modules in an example of a tile architecture for an implementation of the integrated circuit 100.

The tile 800 includes a main processor 802 that provides the main computational resource inside the tile. The tile 800 includes a cache module 804 that includes memory that can be configured as a cache managed by a cache state machine inside the module 804. The tile 800 includes a DMA engine 806 to manage access to external memory, enabling the main processor 802 to perform other tasks.

The main processor 802 communicates over the dynamic network through a dynamic network switch module 808, and over the static network through a static network switch module 810. The main processor 802 sends data to and receives data from the switch modules to communicate with other tiles and I/O devices via the inter-tile data paths. The switch modules include switching circuitry to forward data received over data paths from other tiles to destinations within a tile and to switches of other tiles, and to forward data received from sources within a tile to switches of other tiles.

The dynamic network switch module 808 manages access to multiple independent dynamic networks, including, for example, the memory dynamic network (MDN) and the I/O dynamic network (IODN). The module 808 includes a "switch point" for each of the dynamic networks accessed by a tile.

Various features of the tiled integrated circuit architecture and programming described herein can be implemented by modifying versions of the tiled integrated circuits described in U.S. patent application Ser. Nos. 11/302,956 or 11/314,861, or in the following publications: "Baring It All to Software: RAW Machines" *IEEE Computer*, September 1997, pp. 86-93, "Space-Time Scheduling of Instruction-Level Parallelism on a Raw Machine," *Proceedings of the Eighth International Conference on Architectural Support for Programming Languages and Operating Systems (ASPLOS-VIII)*, San Jose, Calif., Oct. 4-7, 1998, "Raw Computation" *Scientific American*, August 1999, Vol. 281, No. 2, pp. 44-47, "The Raw Microprocessor: A Computational Fabric for Software Circuits and General Purpose Programs," *IEEE Micro*, March/April 2002, pp. 25-35, and "A 16-issue multiple-program-counter microprocessor with point-to-point scalar operand network," *Proceedings of the IEEE International Solid-State Circuits Conference*, February 2003, each of which is incorporated herein by reference.

Various techniques described herein can be implemented in additional types of integrated circuit architectures. For example, some techniques can be used in an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units.

It is to be understood that the foregoing description is intended to illustrate and not to limit the scope of the invention, which is defined by the scope of the appended claims. Other embodiments are within the scope of the following claims.

What is claimed is:

1. A method for processing data for pattern matching, the method comprising:

receiving a first sequence of data values; and
generating, by at least one processor, a second sequence of data values based on the first sequence, one or more patterns, and a history of data values in the first sequence, with the second sequence having fewer data values than the first sequence and all subsequences in the first sequence that match at least one of the one or more patterns being represented in the second sequence, with generating the second sequence of data values comprising
generating data values according to an associated buffer state corresponding to at least some of the first sequence of data values, the buffer state corresponding to fewer than or equal to a maximum number of data values, and
outputting at least one of the data values corresponding to the buffer state to prevent overflow of the buffer state beyond the maximum number of data values.

2. The method of claim 1, wherein generating the second sequence comprises replacing an original subsequence of data values in the first sequence with a shorter subsequence of data values that corresponds to the same transition vector of a pattern-matching finite state machine associated with the one or more patterns as the original subsequence.

3. The method of claim 1, wherein the subsequences in the first sequence that match at least one of the one or more patterns are included in the second sequence.

4. The method of claim 1, wherein a given subsequence in the first sequence that matches at least one of the one or more patterns is represented in the second sequence by one or more data values that correspond to the same transition vector of a pattern-matching finite state machine associated with the one or more patterns as the given subsequence.

5. The method of claim 4, wherein the given subsequence in the first sequence that matches at least one of the one or more patterns is represented in the second sequence by a single character that correspond to the same transition vector of the pattern-matching finite state machine as the given subsequence.

6. The method of claim 1, wherein the buffer state corresponds to data values stored in a buffer.

7. The method of claim 1, wherein the buffer state corresponds to data values associated with a state of a finite-state machine.

8. The method of claim 1, wherein generating the second sequence of data values comprises evaluating data values corresponding to the buffer state for possible reduction.

9. The method of claim 1, wherein generating the second sequence of data values comprises processing the first sequence according to a finite-state machine.

10. The method of claim 9, wherein the number of states in the finite-state machine are determined according to an amount of compression of the second sequence relative to the first sequence.

11. The method of claim 1, wherein at least some of the patterns are specified by a regular expression.

12. A system, comprising:
a plurality of processor cores interconnected by an interconnection network; and
information for configuring the system to execute instructions to
receive a first sequence of data values,
generate a second sequence of data values based on the first sequence, one or more patterns, and a history of data values in the first sequence, with the second sequence having fewer data values than the first sequence and all subsequences in the first sequence that match at least one of the one or more patterns being represented in the second sequence, with generating the second sequence of data values comprising
generating data values according to an associated buffer state corresponding to at least some of the first sequence of data values, the buffer state corresponding to fewer than or equal to a maximum number of data values, and
outputting at least one of the data values corresponding to the buffer state to prevent overflow of the buffer state beyond the maximum number of data values, and
match the second sequence of data values to the one or more patterns in a plurality of processor cores.

13. The system of claim 12, further comprising a memory for storing the information for configuring the system.

14. The system of claim 12, wherein generating the second sequence comprises replacing an original subsequence of data values in the first sequence with a shorter subsequence of data values that corresponds to the same transition vector of a pattern-matching finite state machine associated with the one or more patterns as the original subsequence.

15. The system of claim 12, wherein the subsequences in the first sequence that match at least one of the one or more patterns are included in the second sequence.

16. The system of claim 12, wherein a given subsequence in the first sequence that matches at least one of the one or more patterns is represented in the second sequence by one or more data values that correspond to the same transition vector of a pattern-matching finite state machine associated with the one or more patterns as the given subsequence.

17. The system of claim 12, wherein the interconnection network comprises a two-dimensional network.

18. The system of claim 12, wherein the interconnection network comprises a bus network, a ring network, a mesh network, or a crossbar switch network.

19. The system of claim 12, wherein each of the plurality of processor cores corresponds to a tile on an integrated circuit, each tile comprising:
a computation unit; and
a switch including switching circuitry to forward data received over data paths of the interconnection network from other tiles to the computation unit and to switches of other tiles, and to forward data received from the computation unit to switches of other tiles.

20. The system of claim 19, wherein the computation unit comprises a pipelined processor and the switch is coupled to a plurality of pipeline stages of the pipelined processor.

21. The system of claim 20, wherein at least one port of the switch is mapped to a register name space of the pipelined processor.

22. The method of claim 1, further comprising performing pattern matching to match the second sequence of data values to the one or more patterns.

23. The system of claim 12, wherein at least a first processor core is configured to break down the first sequence of data values into segments and distribute the segments to different respective processor cores including a second processor core configured to generate the second sequence of data values.

24. The system of claim 23, wherein the first of the processor cores is configured to distribute the segments based on respective sets of patterns to be matched.

25. The system of claim 23, wherein the different respective processor cores are configured to provide data values to the plurality of processor cores configured to match the second sequence of data values to the one or more patterns.

26. The system of claim 25, wherein at least a third processor core is configured to collect outputs of multiple of the plurality of processor cores configured to match the second sequence of data values to the one or more patterns.

27. A method for processing data for pattern matching in an integrated circuit comprising a plurality of processor cores interconnected by an interconnection network, the method comprising:

receiving a first sequence of data values;

breaking down the first sequence of data values into segments in at least one processor core and distributing the segments to different respective compressor processor cores;

for each of the compressor processor cores, generating a second sequence of data values based on the first sequence, one or more patterns, and history of data values in the first sequence, with the second sequence having fewer data values than the first sequence and all subsequences in the first sequence that match at least one of the one or more patterns being represented in the second sequence, with generating the second sequence of data values comprising generating data values according to an associated buffer state corresponding to at least some of the first sequence of data values, the buffer state corresponding to fewer than or equal to a maximum number of data values, and outputting at least one of the data values corresponding to the buffer state to prevent overflow of the buffer state beyond the maximum number of data values;

for each of multiple pattern matching processor cores coupled to a respective compressor processor core, performing pattern matching on the second sequence of data values to match the second sequence of data values to the one or more patterns of the respective compressor processor core; and collecting outputs of multiple of the pattern matching processor cores in at least one processor core.

* * * * *